(12) United States Patent
Zhang et al.

(10) Patent No.: US 7,930,155 B2
(45) Date of Patent: Apr. 19, 2011

(54) MASS CONSERVING ALGORITHM FOR SOLVING A SOLUTE ADVECTION DIFFUSION EQUATION INSIDE AN EVAPORATING DROPLET

(75) Inventors: Jie Zhang, Santa Clara, CA (US); Jiun-Der Yu, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 482 days.

(21) Appl. No.: 12/107,674

(22) Filed: Apr. 22, 2008

(65) Prior Publication Data
US 2009/0265151 A1  Oct. 22, 2009

(51) Int. Cl.
*G06G 7/50* (2006.01)
(52) U.S. Cl. ............................................. 703/9
(58) Field of Classification Search .................. None
See application file for complete search history.

(56) References Cited

U.S. PATENT DOCUMENTS

| | | | |
|---|---|---|---|
| 6,271,856 B1 | 8/2001 | Krishnamurthy | |
| 6,574,650 B1 | 6/2003 | Aoki | |
| 6,810,370 B1 | 10/2004 | Watts, III | |
| 6,906,458 B2 | 6/2005 | Kobayashi | |
| 7,006,088 B1 | 2/2006 | Guskov et al. | |
| 7,085,695 B2 | 8/2006 | Yu et al. | |
| 7,117,138 B2 | 10/2006 | Yu et al. | |
| 7,359,841 B1* | 4/2008 | Hixon | 703/2 |
| 7,478,023 B2* | 1/2009 | Yu | 703/9 |
| 2002/0046014 A1 | 4/2002 | Kennon | |
| 2004/0181383 A1 | 9/2004 | Yu et al. | |
| 2004/0181384 A1 | 9/2004 | Yu | |
| 2005/0243117 A1 | 11/2005 | Yu | |
| 2006/0000081 A1 | 1/2006 | Kondo | |
| 2006/0044506 A1 | 3/2006 | Kida et al. | |
| 2007/0051958 A1 | 3/2007 | Yamazaki et al. | |
| 2007/0073527 A1 | 3/2007 | Flandrin et al. | |
| 2007/0109606 A1 | 5/2007 | Nagae | |
| 2007/0136042 A1 | 6/2007 | Yu | |
| 2010/0121616 A1* | 5/2010 | Schick et al. | 703/2 |
| 2010/0121620 A1* | 5/2010 | Schick et al. | 703/2 |

FOREIGN PATENT DOCUMENTS

| | | |
|---|---|---|
| EP | 0980048 B1 | 10/2003 |
| JP | 2003-186918 | 7/2003 |
| JP | 2006-318481 | 11/2006 |

OTHER PUBLICATIONS

Di, et al., "Level Set Calculations for Incompressible Two-Phase Flows on a Dynamically Adaptive Grid", Oct. 10, 2006, pp. 1-24.

Deegan, Robert D., et al., "Contact Line Deposits in an Evaporating Drop", Physical Review E, 62(1):756-765, Jul. 2000, The American Physical Society, College Park, MD.

(Continued)

*Primary Examiner* — David Silver

(57) ABSTRACT

The present invention is directed towards systems and methods for simulating and analyzing a change in concentration of solute in a solution. The solution being simulated is encompassed by an interface. The concentration at a first point in time is determined at a set of nodes encompassed by the interface. A spatial cell is associated with each node. An extended concentration is calculated at an extended node. The extended node is not encompassed by the interface. The concentration is calculated at a second point in time at a set of nodes encompassed by the interface, based upon the concentration at the set of nodes encompassed by the interface at the first point in time and the extended concentration.

14 Claims, 16 Drawing Sheets

OTHER PUBLICATIONS

Deegan, Robert D., et al., "Capillary Flow as the Cause of Ring Stains from Dried Liquid Drops", Nature, 389 (23):827-829, Oct. 1997, Nature Publishing Group, London, United Kingdom.

Deegan, Robert D., "Pattern Formation in Drying Drops", Physical Review E, 61(1):475-485, Jan. 2000, The American Physical Society, College Park, MD.

Van Dam, Dirkjan B., "Layer Thickness Distribution of Thin-Film Ink-Jet Printed Structures", XXI International Congress of Theoretical and Applied Mechanics, Aug. 15-21, 2004, Warsaw, Poland.

Xu, Jun, et al., "Self-Assembly of Gradient Concentric Rings via Solvent Evaporation from a Capillary Bridge", Physical Review Letters, 96(06):066104, Feb. 17, 2006, The American Physical Society, College Park, MD.

Shepel, Sergey V., et al., "Implementation of a Level Set Interface Tracking Method in the FIDAP and CFX-4 Codes", Journal of Fluids Engineering, vol. 127(4):674-686, Jul. 2005, ASME International, New York, NY.

Yamaue, Tatsuya, et al., "The Modeling and Simulation of Dot Formation Kinetics in the Drying Process of Polymer Solution Drop", Proceedings of Third International Conference on Multiscale Materials Modeling, 953-956, Sep. 18, 2006, Fraunhofer Institute for Mechanics of Materials IWM, Freiburg, Germany.

Little, Jeffery K., "Simulation of Droplet Evaporation in Supercritical Environments Using Parallel Molecular Dynamics", Thesis, Aug. 1996, Pennsylvania State University, Department of Aerospace Engineering, University Park, PA.

J. A. Sethian, "Level Set Methods and Fast Marching Methods," Cambridge University Press, New York, N.Y., 1999, p. 9.

Osher, S., et al., "Level Set Methods", Feb. 25, 2000, pp. 1-61.

Tryggvason, G., et al., "A Front-Tracking Method for the Computations of Multiphase Flow", Journal of Computational Physics 169, Jan. 5, 2001, pp. 708-759.

Osher, S., et al., "Fronts Propagating with Curvature Dependent Speed: Algorithms Based on Hamilton-Jacobi Formulations", Journal of Computational Physics, 79, pp. 12-49, 1988.

Osher, S., et al., "Level Set Methods: An Overview and Some Recent Results", Sep. 5, 2000, pp. 1-65.

Proceedings of MMM Third International Conference Multiscale Materials Modeling, Symposium 8 Multiscale Simulation Approaches for Static and Dynamic Properties of Macromolecular Materials, Sep. 18-22, 2006, pp. 921-927; 928-931; 953-956.

G. Tryggvason, et al., "A Front Tracking Method for the Computations of Multiphase Flow", Feb. 2001, pp. 1-58.

* cited by examiner

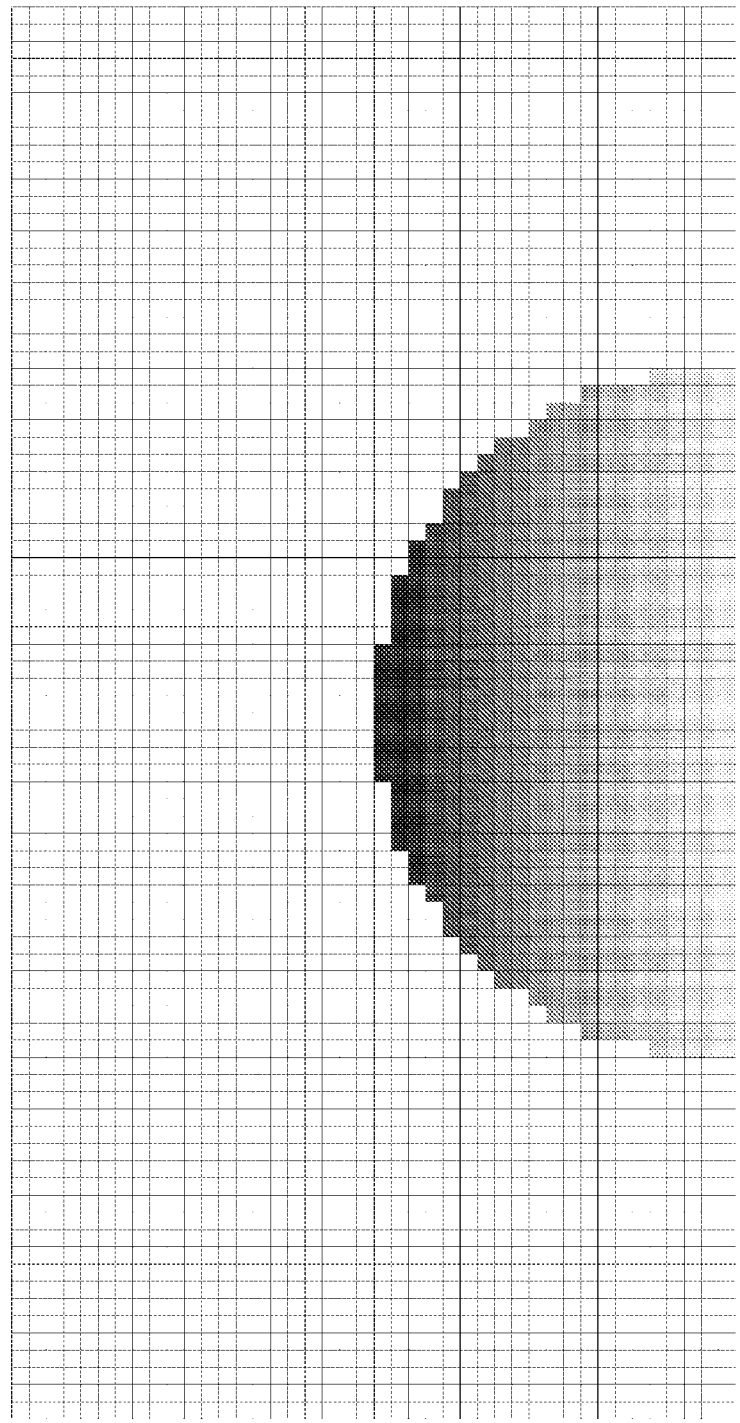

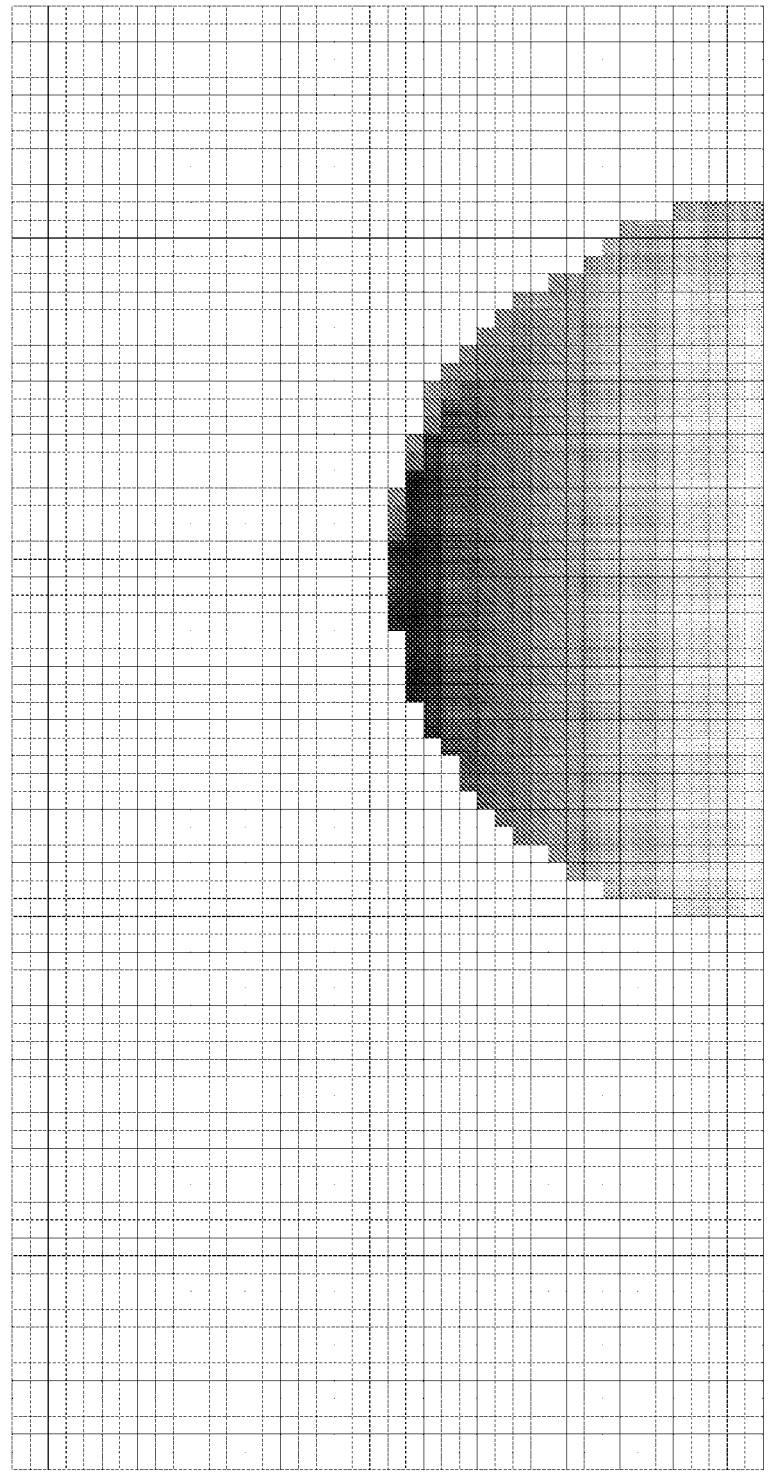

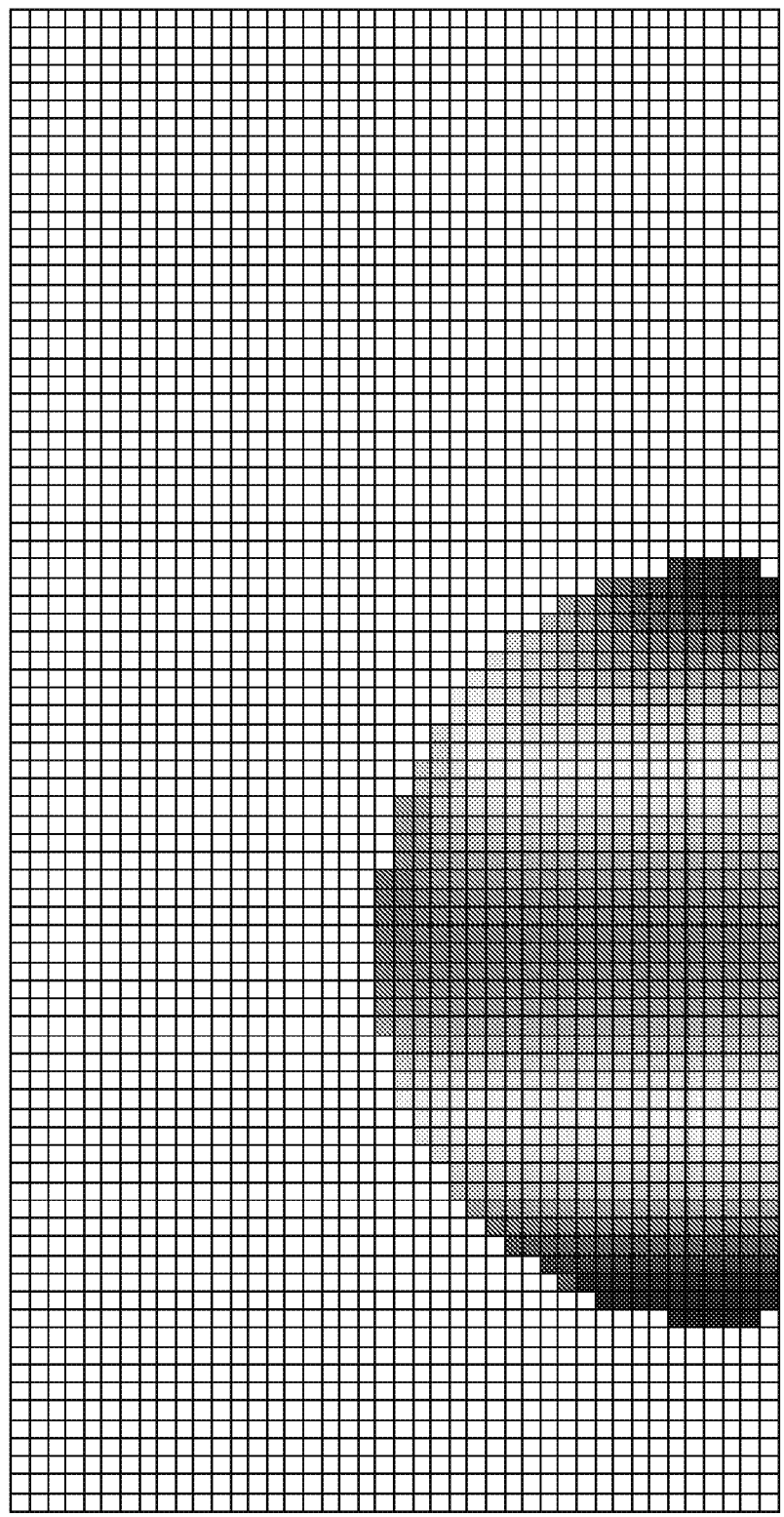

MASS CONSERVING ALGORITHM FOR SOLVING A SOLUTE ADVECTION DIFFUSION EQUATION INSIDE AN EVAPORATING DROPLET

CROSS-REFERENCE TO RELATED APPLICATIONS

U.S. patent application Ser. No. 11/777,076 filed on Jul. 12, 2007 now U.S. Pat. No. 7,813,907) is hereby incorporated by reference in its entirety.

BACKGROUND OF THE INVENTION

Inkjet technology has advanced to the point where it is beginning to supplant traditional industrial printing, patterning, and production techniques. Inkjet technology is being used to deposit functional materials with unique physical properties. For example, inkjet technology can be used to produce LCD TFT transistor, OLED device, solar cells, and microcircuits. Using inkjet technology instead of traditional techniques to produce these items can save money, materials, and reduce waste. Inkjet technology includes depositing droplets onto a substrate.

The material being deposited may not have the fluid properties that would allow it to be used directly in the ink jetting process. In this situation, the material being deposited is dissolved as a solute in a solvent, forming an inkjetable solution. The inkjetable solution has the desired properties of an inkjetable fluid. In the inkjet printing process, small droplets containing a solute with the desired properties and a solvent are deposited onto a substrate. After the droplet reaches the substrate, the solvent evaporates, and only the solute is left, forming a residual pattern. The residual pattern is a direct result of the manner in which the solvent evaporates. The final pattern of the deposited solute directly determines the desired final product quality.

1. Field of the Invention

The present invention relates to systems and methods for simulating the evaporation of a solvent from a fluid that is enclosed by a deformable boundary.

2. Description of the Related Art

In order to achieve a better quality of the final product, it is crucial to understand how the final pattern is formed, what are the major factors affecting the final pattern, and how to control the parameters to achieve the desired pattern? It is very challenging to obtain a general analytic solution to such a process. Hence, a numerical simulation is an appropriate approach. Prior numerical methods have done a poor job of conserving the total mass of the solute coupled with the evolution of the solute concentration. What is needed is a simulation method that does a good job of conserving the total mass of the solute.

SUMMARY OF THE INVENTION

An embodiment of the present invention is directed towards a system, a method, or a computer-readable medium encoded with instructions for simulating and analyzing a change in concentration of a solute in a solution. The solution being simulated is encompassed by an interface. The concentration at a first point in time is determined at a set of nodes encompassed by the interface. A spatial cell is associated with each node. An extended concentration is calculated at an extended node. The extended node is not encompassed by the interface. The concentration is calculated at a second point in time at a set of nodes encompassed by the interface, based upon the concentration at the set of nodes encompassed by the interface at the first point in time and the extended concentration.

An embodiment of the present invention may include identifying a first type of extended node. The first type of extended node is a neighbor of a first type of test node. The first type of test node is encompassed by the interface. Only one of the neighbors of the first type of test node is not encompassed by the interface. All other neighbors of the first type of test node are encompassed by the interface.

An embodiment of the present invention may include identifying a second type of extended node. Half the second type of extended node's neighboring nodes are encompassed by the interface. The nodes encompassed by the interface neighboring the second type of extended node are identified as belonging to a set of a second type of test nodes associated with the second type of extended node. A node neighboring at least two nodes in the set of the second type of test nodes associated with the second type of extended node and is also encompassed by the interface is identified as belonging to the set of the second type of test nodes associated with the second type of extended node.

A node is neighboring another node when it is within specified distance from the other node. The specified distance may be the minimum distance between nodes or may be some multiple of the minimum distance. For irregular meshes a node may be a nodes neighbor if it is one of a specified number of nodes that are closest to the node.

An embodiment of the present invention may include calculating an extended concentration at the first type of extended node using a first method and calculating an extended concentration at the second type of extended node using a second method distinct from the first method.

In an embodiment of the present invention the first method may comprise calculating the extended concentration based upon: the concentration at the first type of test node; the concentration at nodes neighboring the first type of test node and encompassed by the interface; and flux across the interface in a region of simulation space bounded by a cell associated with the first type of test node and the cell associated with the first type of extended node.

In an embodiment of the present invention the second method may comprise calculating the extended concentration based upon: the concentration at the set of second type of test nodes associated with the second type of extended node; and the flux across the interface in a region of simulation space bounded by cells associated with the set of second type of test nodes associated with the second type of extended node and the cell associated with the second type of extended node.

In an embodiment of the present invention, calculating the concentration at the second point in time may comprise calculating the diffusion of the solute in the solution from a first point to a second point in time.

In an embodiment of the present invention, calculating the concentration at the second point in time comprises calculating the advection of the solution from a first point to a second point in time.

An embodiment of the present invention may be a computer-readable medium encoded with instructions for performing the invention. An embodiment of the present invention may be a system with instructions to perform the invention.

In an embodiment of the present invention, the spatial location of a portion of the interface may vary with time. The interface may include a moveable surface between the solution and the environment. The interface may also include a temporally stable substrate.

In an embodiment of the present invention, calculating the concentration may include calculating the advection of the solution from a first point in time to a second point in time. Calculating the concentration may also include calculating the motion of the interface from a first point in time to a second point in time based in part on the results of calculating the advection of the solution. Calculating the concentration may also include calculating the diffusion of the solute based in part on the results of calculating the advection and calculating the motion of the interface.

In an embodiment of the present invention, each spatial cell may be representative of a specific area or a specific volume.

An embodiment of the present invention may be a system, a method, or a computer-readable medium encoded with instructions for simulating and analyzing the evaporation of a solution. Simulating evaporation may include discretizing a simulation space as a set of nodes. Each particular node is associated with a particular cell in the simulation space. Each particular node is representative of a particular point in the simulation space.

A plurality of nodes may be identified as environment nodes at a first point in time in the simulation space. The environment nodes are representative of points in the simulation space in which the solution is absent. The plurality of environment nodes as a group, are representative of the environment in which solution is being simulated.

A plurality of nodes may be identified as droplet nodes at a first point in time in the simulation space. The droplet nodes are representative of points in the simulation space in which the solution is present. The plurality of droplet nodes as a group is representative of the solution.

An interface may be identified at the first point in time between the droplet nodes and the environment nodes. The interface represents a surface separating the solution from the environment. The concentration of solute in the solution is determined at the plurality of droplet nodes at the first point in time.

The concentration of the solute may be determined at a plurality of nodes at a second point in time based upon the advection and diffusion of the solution.

A first type of extended node may be identified. The first type of extended node is an environment node and is a neighbor of a first type of test node. The first type of test node is a droplet node. Only one of the neighbors of the first type of test node is an environment node, and all other neighbors of the first type of test node are droplet nodes.

An extended concentration of solute in the solution at the first type of extended node is calculated based upon the concentration of solute at the first type of test node. The concentration of the solute at the droplet nodes neighboring the first type of test node, and the flux across a portion of the interface in a region of simulation space bounded by a cell associated with the first type of test node and a cell associated with the first type of extended node.

A second type of extended node is identified. The second type of extended node is an environment node. Half of the second type of extended node's neighboring nodes are droplet nodes. Droplet nodes neighboring the second type of extended node are identified as a set of a second type of test nodes associated with the second type of extended node. A droplet node neighboring at least two nodes in the set the second type of test nodes associated with the second type of extended node is identified as belonging to the set of the second type of test nodes associated with the second type of extended nodes.

An extended concentration of solute in the solution at the second type of extended node is calculated based upon: the concentration of solute at the set of second type of test nodes associated with the second type of extended node; and the flux across the interface in a region of simulation space bounded by cells associated with the set of second type of test nodes associated with the second type of extended node and a cell associated with the second type of extended node.

The diffusion of the concentration at the droplet nodes at a second point in time is calculated based upon the concentration of solute at the droplet nodes and the extended concentration of solute at the first and second type of extended nodes.

The advection of the solution may be calculated based upon the concentration of the solute at the first point in time and an estimation of a local velocity of the solution at the first point in time. Calculating the advection of the solution may include calculating the concentration of the solute at a particular node at a second point in time based on: the concentration of the solute at the particular node at the first point in time; the concentration of the solute at the particular node's neighbors at the first point in time; and the identity of each of the node's neighbors as either a droplet node or an environment node.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIGS. 4A-E are illustrations of the simulation including the concentration gradients;

DESCRIPTION OF THE PREFERRED EMBODIMENTS

An embodiment of the present invention is a numerical simulation of a droplet evaporating, in which the total mass of the solute is well conserved. An algorithm incorporating the present invention can effectively simulate a diffusion-dominated type of evaporative flux across a time-varying boundary of a droplet. The present invention may be used to simulate a variety of fluids containing a solute using various models to describe the evaporation of the solvent.

Ink jet technology can be used to make a variety of products. In order to achieve a high quality final product, it is crucial to understand how the final pattern is formed, what are the major factors affecting the final pattern, and how to control the parameters to achieve the desired pattern? An embodiment of the present invention is the first ever, direct numerical simulation of a droplet evaporating in which the mass of the solute is well conserved. An algorithm, which embodies the present invention, accurately resolves the diffusion controlled flux of a solvent within a time-varying domain. The algorithm can be applied to any single fluid containing a solute with various evaporating models.

Figure 1:
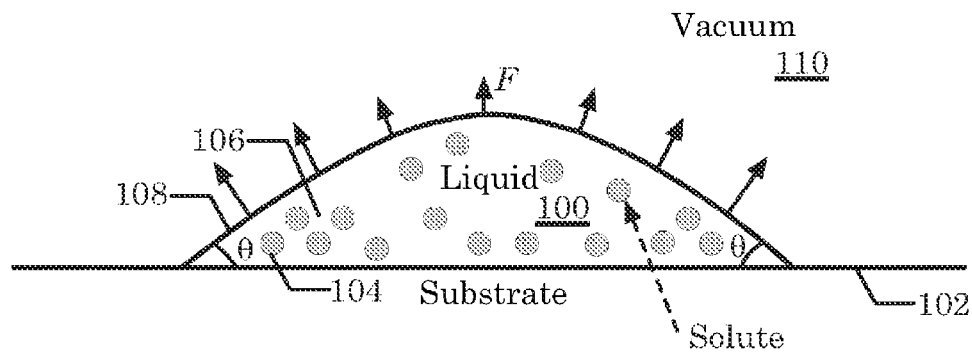
FIG. 1 is an illustration of a droplet, which an embodiment of the present invention may be used to simulate.

FIG. 1 is an illustration of a droplet 100, which an embodiment of the present invention may be used to simulate. The droplet 100 may reside on a substrate 102 that may not deform over time. The droplet 100 may substantially consist of a solute 104 and a solvent 106. The droplet may be encapsulated by an interface 108 that deforms over time. The interface may separate the droplet 100 from the environment 110, which may be a vacuum. As shown in FIG. 1, θ is the contact angle between the substrate 102 and the interface 108 as measured from inside the droplet 100. The flux F as shown in FIG. 1 is the rate at which fluid changes from liquid phase to gas phase per unit of surface area at the interface 108.

Governing Equations

In the following embodiment of the present invention the droplet 100 is considered to be stable and at a constant temperature. The present embodiment of current invention does not include the effect of any chemical reactions that might be occurring inside the droplet 100. An individual skilled in the art would appreciate that the present invention may be easily modified to simulate a system in which the temperature was not constant, the droplet 100 is not stable, and/or chemical reactions are occurring inside the droplet 100.

An embodiment of the present invention may include a solute that does not diffuse through the interface 108 and into the environment 110. Thus in one embodiment the total mass of solute is conserved within the volume of the droplet 100. A concentration C of the solute may be measured as either the weight of solute per weight of solvent (w/w) or as the volume of the solute per volume of solvent.

In an embodiment of the present invention, the variation of the concentration C with time inside the droplet 100 may obey an advection diffusion equation such as equation (1). As used in equation (1) D is the diffusion coefficient of the solute in the solvent and $\vec{u}$ is the velocity of the fluid in the solution.

$$\frac{\partial C}{\partial t} + \vec{u} \cdot \nabla C = D\nabla^2 C \quad (1)$$

As time progresses, the droplet 100 is evaporating. As the droplet 100 evaporates, the volume V of the droplet 100 decreases. Along with the volume V decreasing the shape of the interface 108 also changes. A Lagrangian frame may be constructed that follows the movement of the interface 108. An embodiment of the present invention may include a boundary condition along the interface 108 such as the one described below.

As shown in FIG. 1, F is the evaporation volume flux, the rate at which the solvent changes from a liquid phase into gas phase per unit surface area. In the following discussion, the evaporation volume flux F has units of $m^3/(m^2 s)$. In the following discussion, it is assumed that the solute concentration C is defined in terms of weight of solute per weight of solvent (w/w) in the liquid phase, and p is the density of the solvent with units of $kg/(m^3)$.

Figure 2:
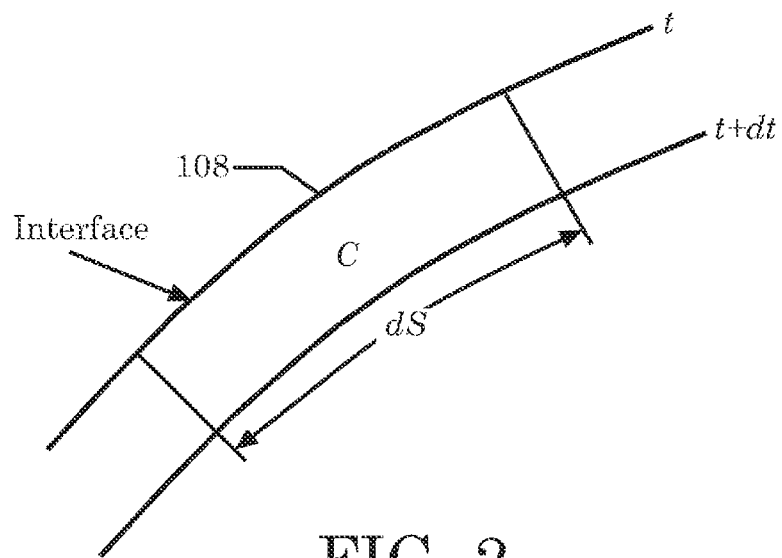
FIG. 2 is an illustration of the interface of the droplet at a first time step and a subsequent time step.

FIG. 2 is an illustration of the interface 108 at a time step t and a time step t+dt. The differential dS is an infinitesimal area of the interface at both time steps t and t+dt. A matter of interest in the simulation is the concentration C and how it changes over time. The concentration C is a state variable that describes the concentration of solute in the droplet in the area whose status has changed from the droplet 100 to the environment 110 in a Lagrangian time frame at the interface 108.

The mass of solvent changing phase from liquid to gas in the unit area dS is ρFdSdt. In an embodiment of the present invention, it may be assumed that the time scale with which the solute diffuses into the gas phase is much longer than the time scale for the solute to dissolve into the liquid phase. The amount of solute that corresponds to the amount of solvent that enters the gas phase through evaporation accumulates in the neighborhood of the interface 108. The mass of solute that accumulates for the unit surface area dS during the time period dt is ρCFdSdt. The total amount of solute that accumulates at the interface 108 over time may be computed using the following surface and time integral, as shown in equation (2).

$$\iint_S \rho C F \, dS \, dt \quad (2)$$

Alternatively, the amount of solute can be evaluated using the following integral over both volume and time, as shown in equation (3).

$$\iint_V \rho C F \, dV \, dt \quad (3)$$

Equation (1) can be transformed into equation (4) by multiplying the density of the fluid ρ and integrating over time and space in a Lagrangian reference frame. The divergence theorem may then be used to change the volume integral into a surface integral. Assuming that the density of the fluid and the diffusion coefficient are constant over the space of the volume integral which is the space defined by droplet 100.

$$\int \int_V \rho \frac{\partial C}{\partial t} dV dt = \int \int_V \rho D \nabla^2 C \, dV \, dt \quad (4)$$
$$= \int \int_S \rho D \nabla C \cdot \hat{n} \, dS \, dt$$

When the mass of the solute is being conserved in the droplet 100, then the change in the mass of the solute as evaluated using either equation (2) and (4) should be equal as described by equation (5).

$$\iint_S \rho D \nabla C \cdot \hat{n} \, dS \, dt = \iint_S \rho C F \, dS \, dt \quad (5)$$

Equation (5) is the integral form of the boundary condition. An individual skilled in the art will appreciate that equation (6) which is a differential form of equation (5) may be simply derived from equation (5).

$$D \nabla C \cdot \hat{n} = CF \quad (6)$$

Numerical Scheme

An embodiment of the present invention may solve the advection diffusion equation (1) for the solute concentration, C, over a time-varying domain, with boundary conditions described by equation (6).

The simulation space may be divided into a discrete mesh. The discrete mesh may be laid out as a regular square finite difference mesh. An individual skilled in the art may appreciate that the mesh may be irregular. The mesh may cover an area greater than the domain of interest, namely the evaporating droplet 100. A separate set of interface markers on the interface 108 of the droplet 100 may be used to track the motion of the interface 108, and calculate a surface tension σ of the interface 108 and the evaporating flux F. An individual skilled in the art will appreciate that there are a variety of systems and methods for calculating the surface tension σ and the evaporating flux F. The present invention is not limited to any particular method of calculating the surface tension σ and evaporating flux F. For example, the flux F may be constant, time dependent, a function of the curvature, or a function of the position of the interface 108.

Figure 3A:
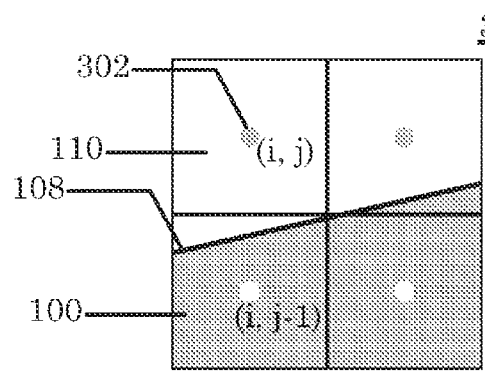
FIGS. 3A and 3B are illustrations of a portion of the interface and a portion of a mesh on which the simulation may occur.
Figure 3B:
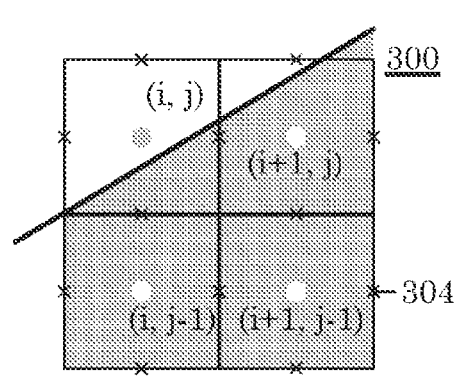

Equation (1) may be solved inside the domain of interest. The domain of interest is the area encapsulated by the interface 108 and the substrate 102. FIG. 3A is an illustration of a portion of the interface 108 and four cells of the mesh 300. Each cell is identified by a pair of indexes. In an embodiment of the present invention, the concentration C is defined only at the cell centers 302 inside the droplet 100. For cell centers in the environment 110 the concentration C is defined as zero. Similarly to FIG. 3A, FIG. 3B is an illustration of a portion of the interface 108 and four cells of the mesh 300. FIG. 3B also illustrates the locations of the velocity $\vec{u}$ of the fluid relative to the mesh 300, and are marked with x's. In an embodiment of the present invention, the velocity $\vec{u}$ of the fluid is defined on the center of the cell edges 304 as shown in FIG. 3B.

The evaporative flux F is defined at the center of each interfacial element. An interfacial element is a portion of the interface defined at two ends by two neighboring interface markers. Alternatively, an interfacial element may be a surface defined by three or more lines connecting three or more neighboring interface markers. In an embodiment of the present invention, each interfacial element is represented by a straight line connecting two neighboring interface markers. In an alternative embodiment of present invention, each interfacial element may be represented by a smooth curve. The boundary conditions of the interface 108 may specify that the interface 108 is continuous. An alternative embodiment of the present invention may specify that the first derivate or one or more higher derivates of the interface are also continuous.

An embodiment of the present invention may solve the advection-diffusion equation (1) numerically using an operator splitting scheme. Equation (1) may be rewritten as equation (7). In which $\mathscr{F}$ is defined in equation (8).

$$\mathscr{F} C = 0 \qquad (7)$$

$$\mathscr{F} = \frac{\partial}{\partial t} + \vec{u} \cdot \nabla - D\nabla^2 \qquad (8)$$

The first two terms of equation (8) is defined as the advection part of the operator $\mathscr{F}$. The third term of equation (8) is the diffusion part of the operator $\mathscr{F}$.

In an embodiment of the present invention an upwind method may be used to calculate the advection part of equation (1) as described in equation (9). A central difference method may be used to calculate the temporal derivative. The velocity vector may be decomposed into two components as described in equation (10). The vertical component u is defined on the center of the horizontal cell edge, while the horizontal component u is defined on the center of the vertical cell edge An individual skilled in the art would appreciate that although a Cartesian coordinate system is used in the following discussion, other coordinate systems may be used without going beyond the scope of the present invention.

$$0 = \frac{C_{i,j}^{n+1} - C_{i,j}^n}{\Delta t} + \max\left(\frac{1}{2}(u_{i+\frac{1}{2},j}^n + u_{i-\frac{1}{2},j}^n), 0\right)\frac{C_{i,j}^{n+1} - C_{i,j}^n}{\Delta x} + \qquad (9)$$

$$\min\left(\frac{1}{2}(u_{i+\frac{1}{2},j}^n + u_{i-\frac{1}{2},j}^n), 0\right)\frac{C_{i+1,j}^n - C_{i,j}^n}{\Delta x} +$$

$$\max\left(\frac{1}{2}(v_{i,j+\frac{1}{2}}^n + v_{i,j-\frac{1}{2}}^n), 0\right)\frac{C_{i,j}^n - C_{i,j-1}^n}{\Delta y} +$$

$$\min\left(\frac{1}{2}(v_{i,j+\frac{1}{2}}^n + v_{i,j-\frac{1}{2}}^n), 0\right)\frac{C_{i,j+1}^n - C_{i,j}^n}{\Delta y}$$

$$= 0$$

$$\vec{u} = u\hat{x} + v\hat{y} \qquad (10)$$

The upwind method described in equation (9) is applied to update the concentration $C^{n+1}$ at all the points (i,j) which are inside the droplet 100. Note that if (i,j) is within one cell of the interface 108, this upwind scheme could end up using concentration C values at points in the environment 110 where C is zero. Thus, the calculation of the gradient of the concentration ∇C can cause numerical errors and introduce artifacts into the solution.

It is a goal of the present invention to prevent errors of the type described above. The present invention resolves this issue by using a different approximation of the concentration gradient ∇C near the interface 108 as needed. An embodiment of the present invention may include a method for extrapolating the concentration C values inside the droplet 100 to those points in the environment 110 neighboring the interface 108 at each time step.

Figure 3C:
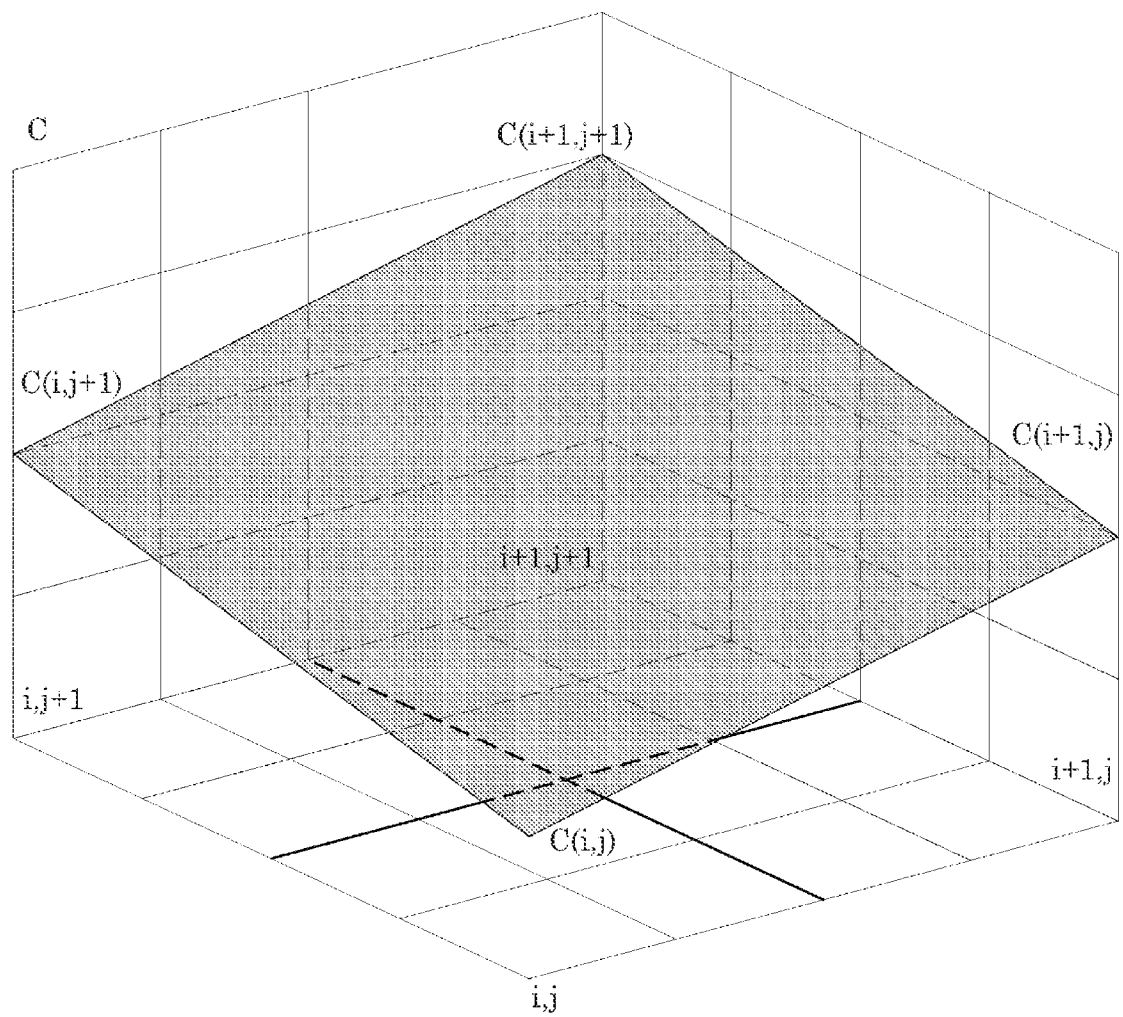
FIG. 3C is an illustration of the concentration of solute in a portion of the mesh.

An embodiment of the present invention may include a zeroth order linear extension of the concentration from the droplet 100 side of the interface 108 to the environment 110 side of the interface 108. For example in FIG. 3A, the extended concentration is set as $C_{i,j} = C_{i,j-1}$. In a second example FIG. 3B, the concentration values of the three closest neighbors, $C_{i+1,j}$, $C_{i,j-1}$, and $C_{i+1,j-1}$, which are on the droplet 100 side of the interface 108 are used to extrapolate the solute concentration on the environment side of the, e.g., $C_{i,j} = C_{i+1,j} + C_{i,j-1} - C_{i+1,j-1}$. Alternatively, a plane may be fitted through three neighboring points in a concentration-spatial space as shown in FIG. 3C, while piecewise continuity is maintained in each cell. FIG. 3C illustrates a three-dimensional space. Two spatial dimensions are used to form a horizontal planar space, while the third vertical dimension represents the concentration of the solute. FIG. 3C illustrates a portion of four cells: i,j; i+1,j; i,j+1; i+1,j+1. The center of each of these cells is shown. The dark lines represent edges of each cell. A gray surface is shown in the three-dimensional space indicating concentration of the solute in the space. The center of cell i,j is on the environment 110 side of the interface 108. Cells i+1,j; i,j+1; i+1,j+1 are on the droplet 100 side of the interface 108. A plane is formed using the values C(i+1,j); C(i,j+1); C(i+1,j+1). An extended concentration value is calculated at the center of the i,j cell from the plane formed by the three neighbors.

Note that the upwind gradient value is set to a constant in the current algorithm, but it can be easily extrapolated using a higher order extrapolation scheme. A zeroth order linear extension has the advantage of adding the least complexity and the lowest need for resources. An individual skilled in the art would appreciate that the invention may be practiced using higher order extensions without going beyond the scope and spirit of the invention as recited in the claims.

A preferred embodiment of the present invention may use an upwind scheme to evaluate the advection operator as opposed to a central difference method. Although the present invention may be practiced using the central difference method other differencing schemes may be used without going beyond the spirit and scope of the present invention as recited in the claims.

As discussed above a mesh 300 encapsulates the area of interest, which is bounded by the interface 108. In the following discussion, the mesh is 2-dimensional and regular. An individual skilled in the art would appreciate that the present invention may be practiced in a three dimensional mesh and/or irregular mesh without going beyond the scope and spirit of the present invention as recited in the claims.

The upwind scheme described by equation (9) maybe rewritten as equation (11) so that the new concentration value $C^{n+1}$ is written in terms of the old concentration value $C^n$.

$$C_{i,j}^{n+1} = C_{i,j}^n - \frac{\Delta t}{2}\begin{pmatrix} \max\left(u_{i+\frac{1}{2},j}^n + u_{i-\frac{1}{2},j}^n, 0\right)\frac{C_{i,j}^n - C_{i-1,j}^n}{\Delta x} + \\ \min\left(u_{i+\frac{1}{2},j}^n + u_{i-\frac{1}{2},j}^n, 0\right)\frac{C_{i+1,j}^n - C_{i,j}^n}{\Delta x} + \\ \max\left(v_{i,j+\frac{1}{2}}^n + v_{i,j-\frac{1}{2}}^n, 0\right)\frac{C_{i,j}^n - C_{i-1,j}^n}{\Delta y} + \\ \min\left(v_{i,j+\frac{1}{2}}^n + v_{i,j-\frac{1}{2}}^n, 0\right)\frac{C_{i,j+1}^n - C_{i,j}^n}{\Delta x} \end{pmatrix} \quad (11)$$

As noted above one of the issues with this scheme is that it does not take into account the effect on a node that is within the droplet 100, but one or more of the node's nearest neighbors are not within the droplet 100. The mesh 300 extends beyond the area of interest inside the droplet 100. The interface 108 divides the nodes in the simulation space into two categories, droplet nodes and environment nodes. An indicator function Ip(i,j) may be used to identify nodes as being on the environment 110 side of the interface 108 or being on the droplet 100 side of the interface 108.

An implementation of the present invention may define the indicator function Ip(i,j) as zero when the node is on the environment 110 side of the interface 108 and one if the node is on the droplet 100 side of the interface 108. The indicator function Ip(i,j) may be calculated at each node using the sign of the level set function. Alternatively, the indicator function Ip(i,j) may only be calculated at nodes near the interface 108. The indicator function Ip(i,j) may be used to negate the effect of the environment nodes. Equation (12) describes an example of how the indicator function Ip(i,j) may be used to modify the upwind scheme described by equation (11) in an embodiment of the present invention.

$$C_{i,j}^{n+1} = C_{i,j}^n - \frac{\Delta t}{2}\begin{pmatrix} \max\left(u_{i+\frac{1}{2},j}^n + u_{i-\frac{1}{2},j}^n, 0\right)\frac{C_{i,j}^n - C_{i-1,j}^n}{\Delta x}[Ip]_{i-1,j}^n + \\ \min\left(u_{i+\frac{1}{2},j}^n + u_{i-\frac{1}{2},j}^n, 0\right)\frac{C_{i+1,j}^n - C_{i,j}^n}{\Delta x}[Ip]_{i+1,j}^n + \\ \max\left(v_{i,j+\frac{1}{2}}^n + v_{i,j-\frac{1}{2}}^n, 0\right)\frac{C_{i,j}^n - C_{i-1,j}^n}{\Delta y}[Ip]_{i,j-1}^n + \\ \min\left(v_{i,j+\frac{1}{2}}^n + v_{i,j-\frac{1}{2}}^n, 0\right)\frac{C_{i,j+1}^n - C_{i,j}^n}{\Delta x}[Ip]_{i,j+1}^n \end{pmatrix} \quad (12)$$

Figure 4C:
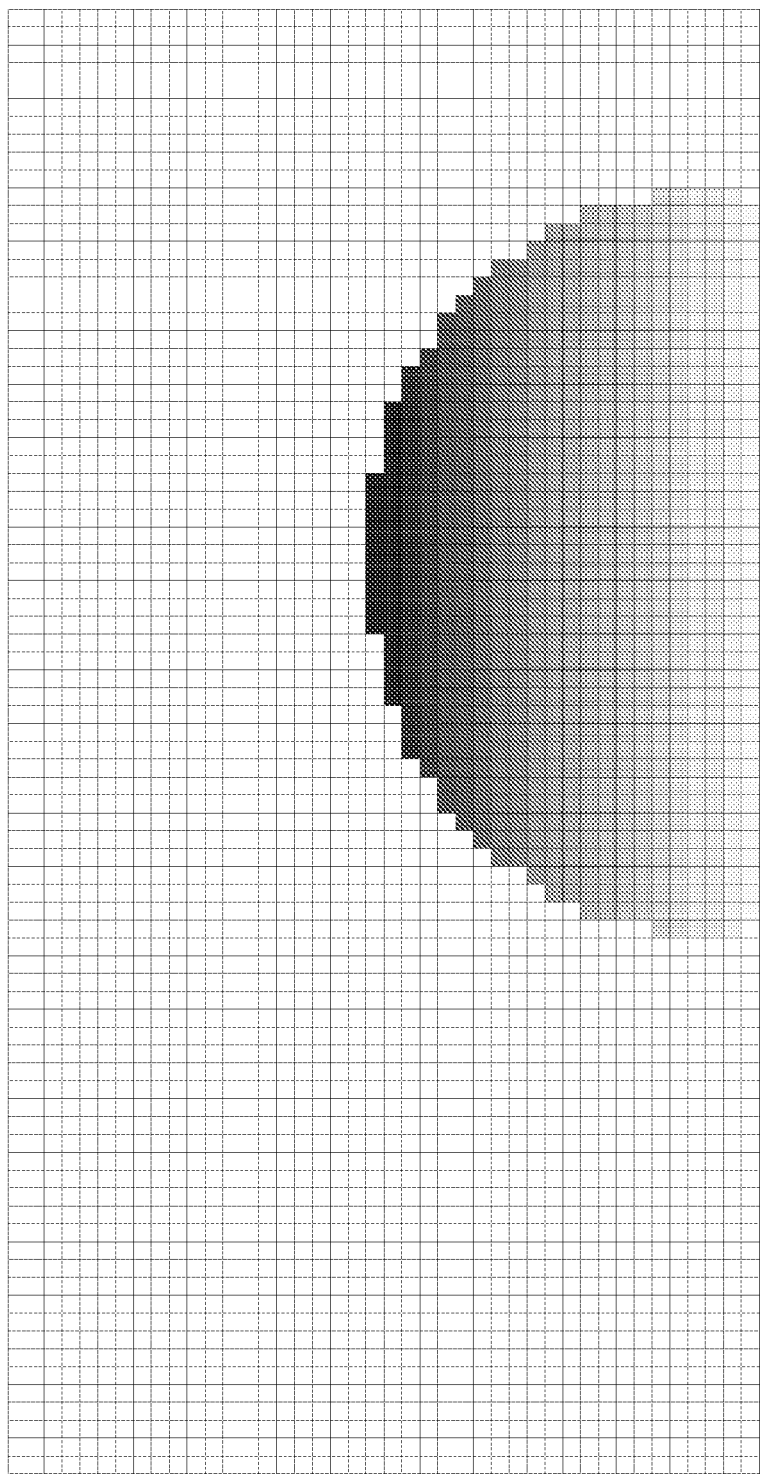
Figure 4D:
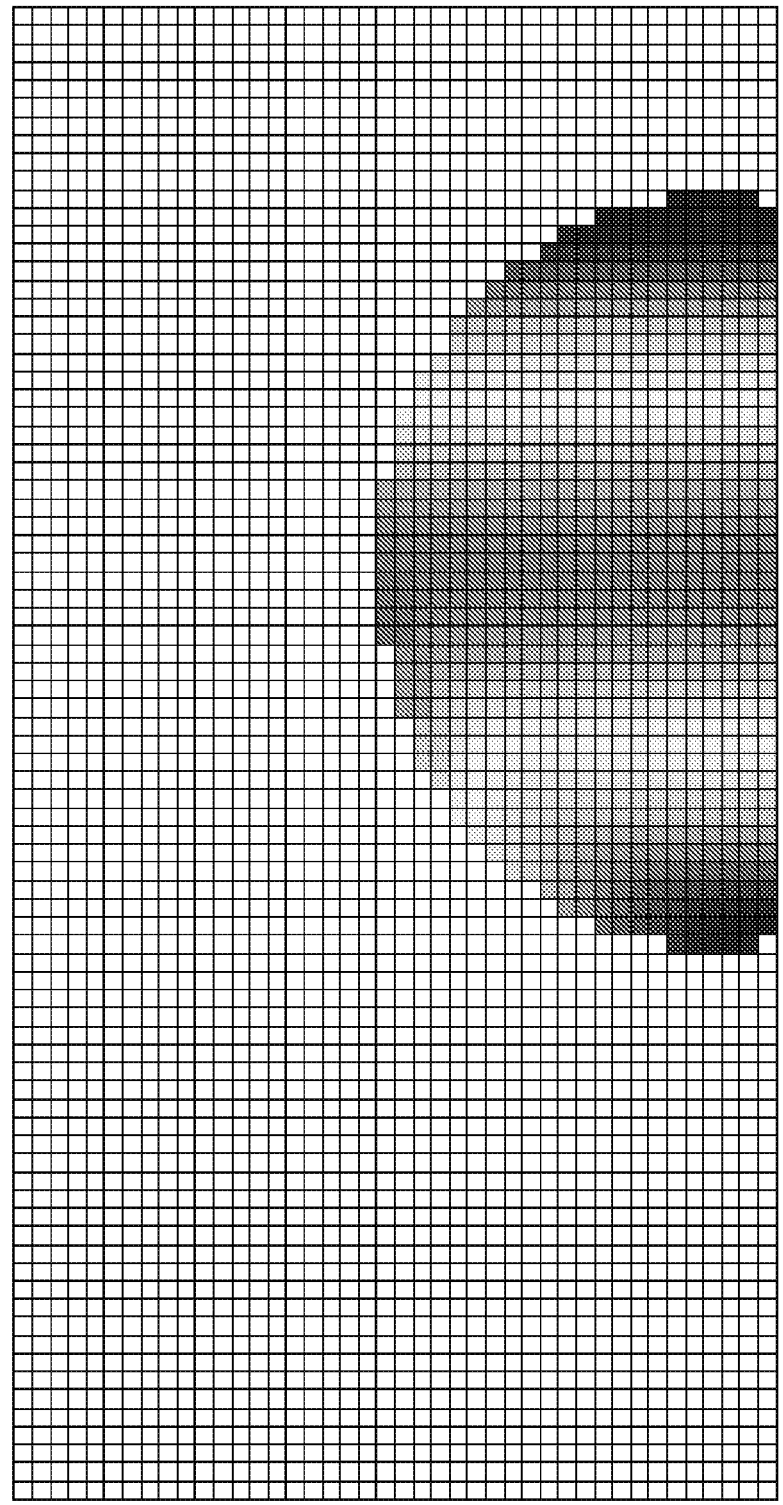

FIGS. 4A-E are illustrations of a system 400 including grid 300 and droplet 100. These figures illustrate tests of the present invention with different concentration profiles that vary in space. The droplet is traveling at a constant velocity. The initial shape of the droplet 100 as shown in FIG. 4A is a half circle. FIG. 4A is an illustration of a droplet 100 at time t=0 and the concentration C varies linearly in the vertical direction. FIG. 4B is an illustration of the droplet 100 from FIG. 4A at time t=1, when the extrapolation step is done before the indicator function Ip(i,j) is updated. FIG. 4C is an illustration of the droplet 100 from FIG. 4A at time t=1, when the extrapolation step is done after the indicator function Ip(i,j) is updated. FIG. 4D is an illustration at time t=1 and the concentration profile C varies horizontally. In the simulation results shown in FIGS. 4A-D the horizontal velocity of the fluid is set to be u=½. FIG. 4E is an illustration at time t=1 and the concentration profile C varies horizontally in which the velocity of the fluid is set to be u=-½.

A comparison of FIGS. 4B and 4C indicates that the best results come from performing the concentration extension step right after the indicator function Ip(i,j) gets updated, as in FIG. 4C. Otherwise, the smearing tends to be much larger for a vertically varying concentration on the leading edge, as shown in FIG. 4B. However, this scheme still has small smearing in the trailing edge for a horizontally varying concentration profile, as shown in FIGS. 4D and 4E.

Figure 5:
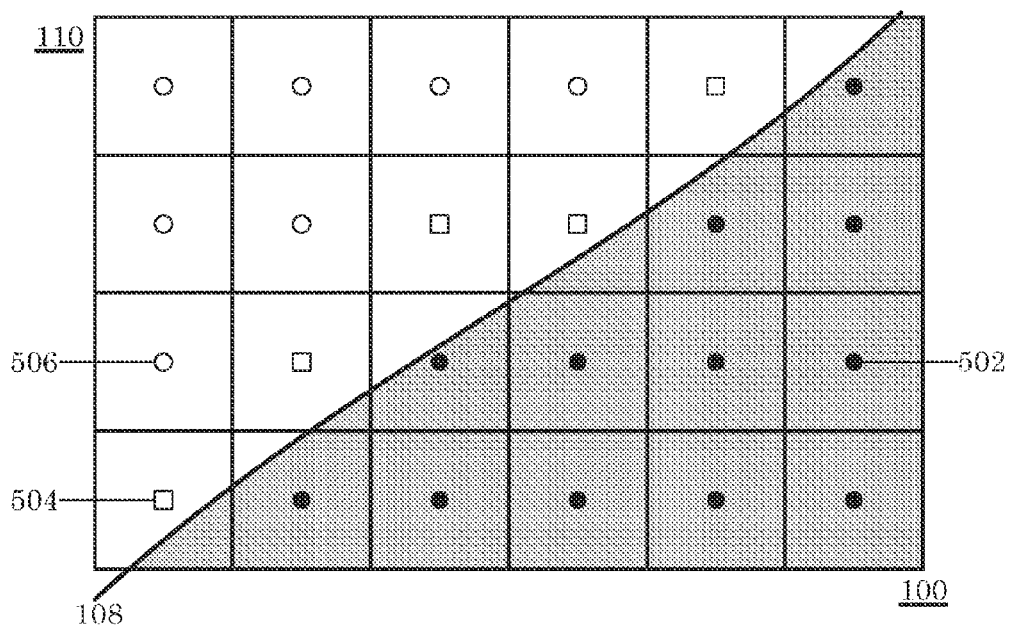
FIG. 5 is an illustration of a portion of an interface of the droplet and a mesh on which the droplet is simulated.

In an embodiment of the present invention, a standard central difference scheme may be used to solve the diffusion part $D\nabla^2$ of the operator $\mathscr{S}$. For a grid point 302 that is inside the droplet 100 and close to the interface 108, this scheme needs concentration C values, which are located outside of the droplet 100 and in the environment 110. An embodiment of the present invention may use a five-point central difference scheme to obtain the discrete diffusion operator $D\nabla^2$. As shown in FIG. 5, the grid points located in the space occupied by the droplet 100 are marked with a black dot • and are labeled as droplet nodes 502. The extended value grid points are marked with an open square ☐ and are labeled as extended value nodes 504. All the other grid points outside the droplet 100 and in the environment 110 are marked with an open circle ○ and are labeled as environment nodes 506.

An embodiment of the present invention may use an extrapolation scheme to evaluate the effect of diffusion that is different from the method used to evaluate the effect of advection. Two distinct methods may be used to identify and evaluate the concentration C at extended value nodes. These methods may be used in series or in parallel.

Figure 6A:
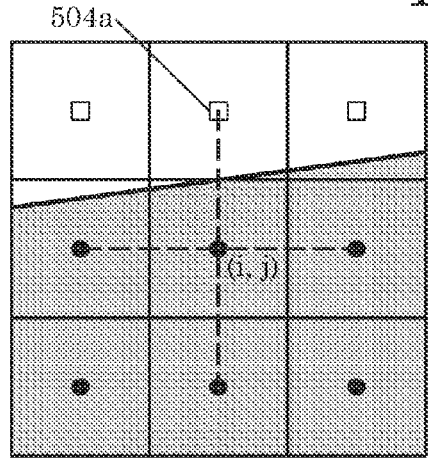
FIGS. 6A-E are illustrations of a portion of an interface of the droplet and a mesh on which the droplet is simulated.
Figure 7A:
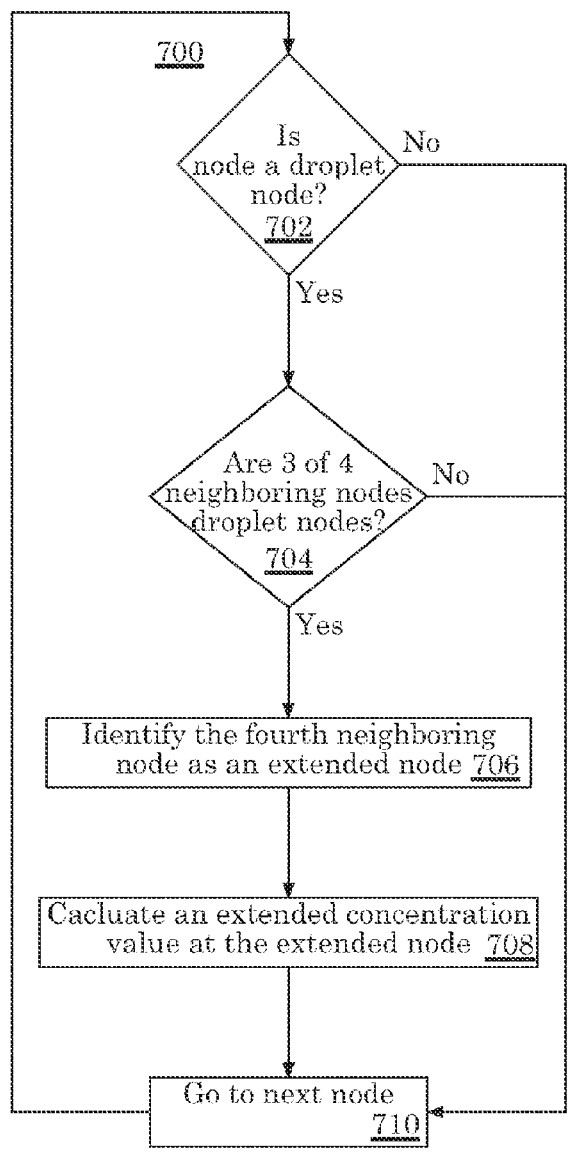
FIG. 7A-7B are illustrations of methods which may be practiced in an embodiment of the present invention.

FIG. 6A is an illustration of the state of a portion of the simulation space in which the present invention may be practiced. FIG. 7A is an illustration of the first method 700. The first method 700 may be applied to each node in the simulation space or to a limited set of nodes near the interface 108.

Step 702 of the first method is to determine if a test node (i,j) is a droplet node. As shown in FIG. 6A, the test node (i,j) is a droplet node. If the test node (i,j) is not a droplet node than method 700 goes to a step 710. If the test node (i,j) is a droplet node then the method 700 goes on to a step 704.

In the step 704, the neighboring nodes of the test node (i,j) are tested. If the number of neighboring nodes that are identified as droplet nodes is three as in FIG. 6A, than the first method 700 continues. Otherwise, the first method 700 goes to a step 710.

The next step, 706, is to identify the non-droplet node as an extended node which in FIG. 6A is identified as node 504a i.e. (i,j+1). Once the extended node has been identified, in a step 708, a five point central difference scheme at the test node (i,j) is used to enforce the boundary condition as shown in equation (13).

$$C_{i,j+1} = C_{i,j-1} + \frac{2\Delta y}{n_{y_{i,j}}} \left[ \frac{1}{D}[CF(s)]_{i,j} - n_{x_{i,j}} \frac{C_{i+1,j} - C_{i-1,j}}{2\Delta x} \right] \quad (13)$$

In equation (13) the x, y components, $n_{x_{i,j}}$ and $n_{y_{i,j}}$, of a vector normal to the interface 108 by the cell (i,j) of the test node (i,j) may be determined using a level set function as shown in equation (14). The level set function may be calculated using the interface markers.

$$\hat{n} = n_x \hat{x} + n_y \hat{y} = \frac{\nabla \phi}{\|\nabla \phi\|} \quad (14)$$

Figure 6B:
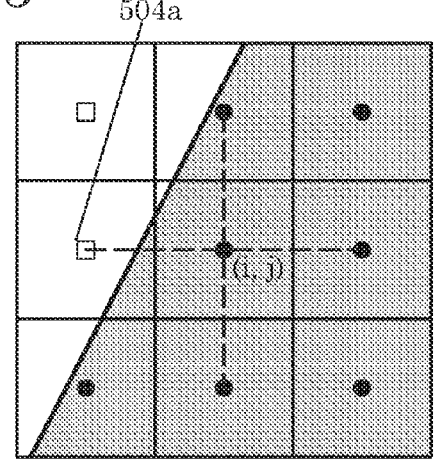

FIG. 6B is similar to FIG. 6A except that the extended node 504a is to the left of the test node (i,j) being tested in the first method 700. Equation (15) is an example of the five point central difference scheme that may be used to enforce the boundary conditions.

$$C_{i-1,j} = C_{i+1,j} - \frac{2\Delta x}{n_{x_{i,j}}} \left( \frac{1}{D}[CF(s)]_{i,j} - n_{y_{i,j}} \frac{C_{i,j+1} - C_{i,j-1}}{2\Delta y} \right) \quad (15)$$

Figure 6C:
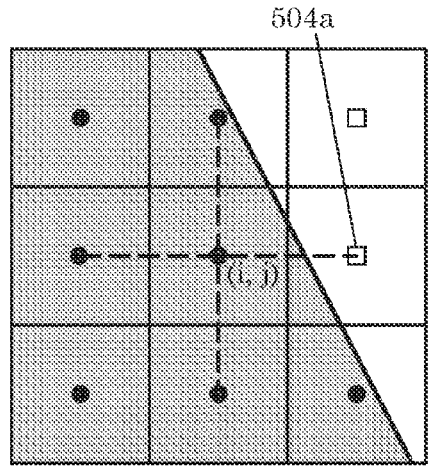

FIG. 6C is the mirror image of FIG. 6B in which the extended node 504a is to the right of the test node (i,j) being tested in the first method 700. Equation (16) is an example of an equation that may be used to enforce the boundary conditions.

$$C_{i+1,j} = C_{i-1,j} + \frac{2\Delta x}{n_{x_{i,j}}} \left( \frac{1}{D}[CF(s)]_{i,j} - n_{y_{i,j}} \frac{C_{i,j+1} - C_{i,j-1}}{2\Delta y} \right) \quad (16)$$

The geometry of the simulation may be such that it is highly improbable that an extended node would appear below the test node (i,j) being tested. An individual skilled in the art would appreciate that enforcing the boundary conditions using at an extended node below the test node (i,j) may be done using a formula similar to equation (13).

The first method 700 may continue on to step 710, which determines if all the nodes have been tested. If all the nodes have not been tested than the first method 700 starts over at step 702. If all of the nodes have been tested than the first method 700 is stopped and the simulation goes on to the next step The concentration values used in equations (13)-(16) may be the concentration values that have been calculated using an upwind equation such as the ones discussed above or from another formulation of the advection equation.

Figure 6D:
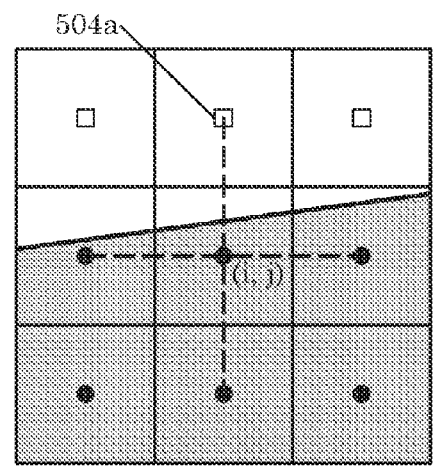

FIG. 6D is similar to FIG. 6A except that the interface 108 does not pass through the upper right hand cell. The extended node 504a shown in FIG. 6D is calculated using equation (13).

Figure 6E:
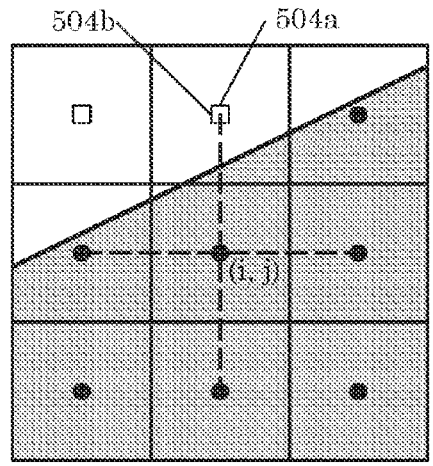

FIG. 6E is similar to FIG. 6A except that the node to the right of the identified extended node 504a is a droplet node. This has no effect on the calculation of the concentration value when the first method 700 is used. Equation (13) may be used to calculate the extended node. As will be seen latter the second method does have an impact on the calculation of the concentration at this extended node.

Figure 7B:
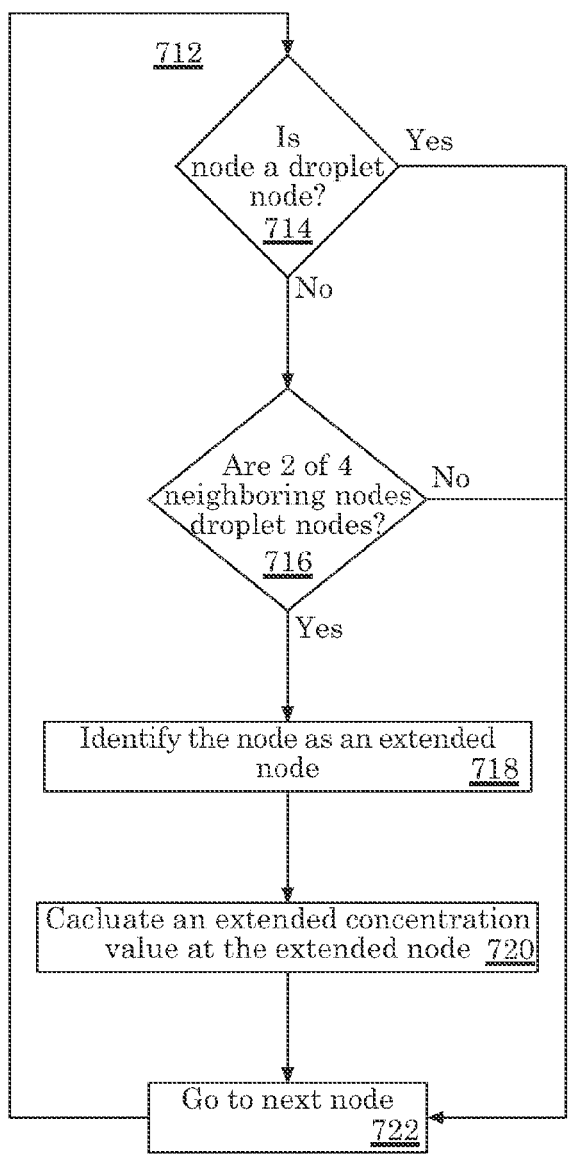

The first method by itself is not sufficient to evaluate all of the extended value nodes. The present invention addresses this issue by using a second method 712 as illustrated in FIG. 7B.

While the first method 700 tested nodes from the perspective of the droplet 100. The second method 712 takes a different tack and tests nodes from the perspective of the environment 110. An embodiment of the present invention may apply the second method 712 to each node in the simulation space or to a limited set of nodes near the interface 108.

The first step 714 of the second method 712 is the same as step 702 of the first method. Except in this case we are looking for a non-droplet node such as (i,j) shown in FIG. 8A. If the node (i,j) is a droplet node than method 712 goes on to the next node in step 722 until all the nodes that are to be tested have been tested. If the node (i,j) not is a droplet node than the second method 712 goes on to a step 716.

Figures 8A, 8B:
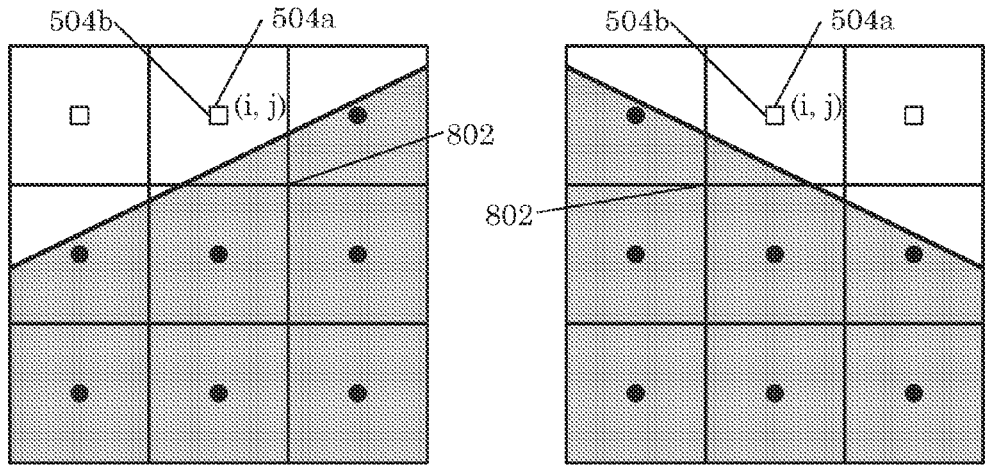
FIGS. 8A-H are illustrations of a portion of an interface of the droplet and a mesh on which the droplet is simulated.
Figure 8C:
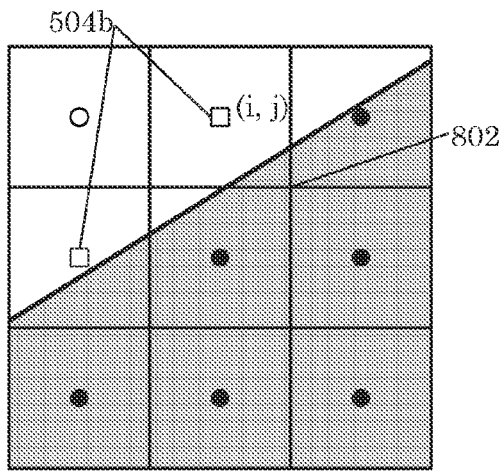
Figure 8D:
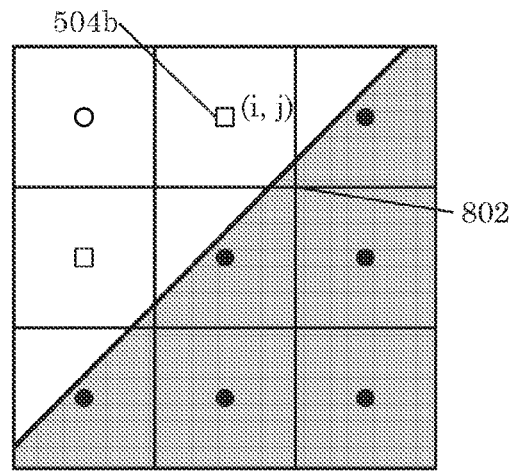
Figure 8E:
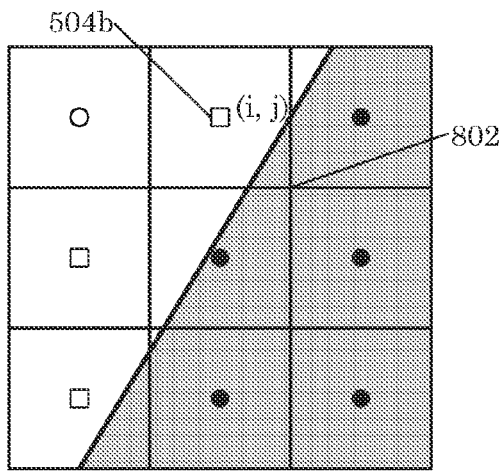
Figure 8F:
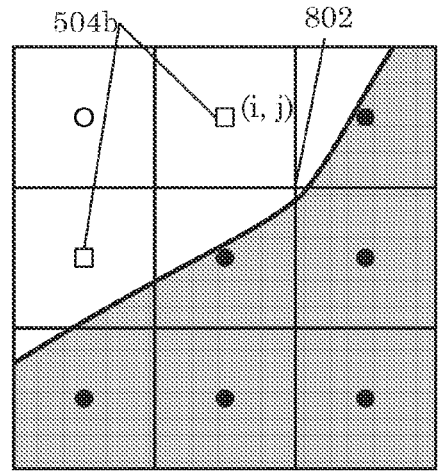
Figure 8G:
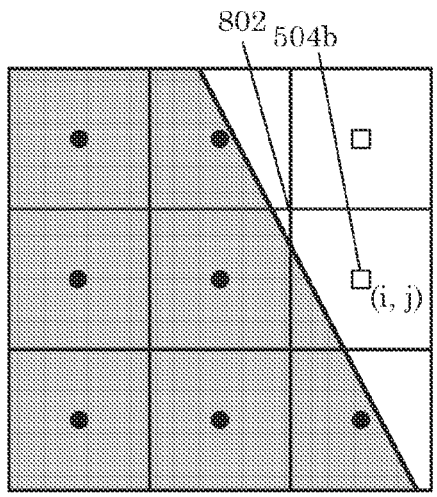
Figure 8H:
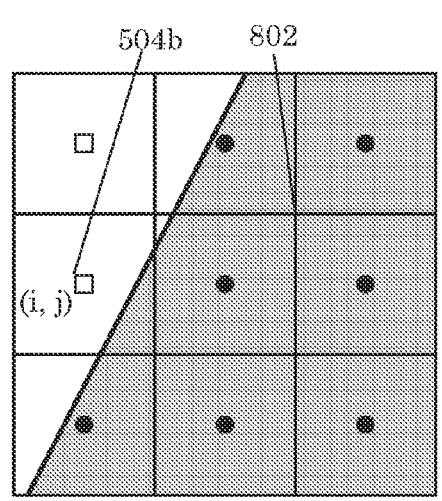

In the step 716 the nearest neighbors of the node (i,j) are tested. If the node to the right or the left of the node (i,j) along with the node below node (i,j) are droplet nodes, as shown in FIGS. 8A-B, than the second method 712 goes on to step 718. Otherwise, the second method 712 goes on to the next node in the step 722 until all the nodes that are to be tested have been tested.

In a step 720 the concentration at the extended node is calculated by enforcing the boundary conditions at the cell edges. If the node to the right of the extended node 504b is a droplet node as in FIG. 8A, than equation (17) is used to enforce the boundary conditions.

$$C_{i,j} = \frac{1}{\frac{n_{y_{i+\frac{1}{2},j-\frac{1}{2}}}}{\Delta y} - \frac{n_{x_{i+\frac{1}{2},j-\frac{1}{2}}}}{\Delta x}} \left( \frac{2}{D}[CF(s)]_{i+\frac{1}{2},j-\frac{1}{2}} - \frac{n_{x_{i+\frac{1}{2},j-\frac{1}{2}}}}{\Delta x}(C_{i+1,j} + C_{i+1,j-1} - C_{i,j-1}) - \frac{n_{y_{i+\frac{1}{2},j-\frac{1}{2}}}}{\Delta y}(C_{i+1,j} + C_{i+1,j-1} - C_{i,j-1}) \right) \quad (17)$$

If the node to the left of the extended node 504b is a droplet node as in FIG. 8B, than equation (12b) is used to enforce the boundary conditions.

$$C_{i,j} = \frac{1}{\frac{n_{y_{i-\frac{1}{2},j-\frac{1}{2}}}}{\Delta y} - \frac{n_{x_{i-\frac{1}{2},j-\frac{1}{2}}}}{\Delta x}} \left( \frac{2}{D}[CF(s)]_{i-\frac{1}{2},j-\frac{1}{2}} - \frac{n_{x_{i-\frac{1}{2},j-\frac{1}{2}}}}{\Delta x}(C_{i,j-1} + C_{i-1,j-1} - C_{i-1,j}) - \frac{n_{y_{i-\frac{1}{2},j-\frac{1}{2}}}}{\Delta y}(C_{i-1,j} + C_{i-1,j-1} - C_{i,j-1}) \right) \quad (18)$$

In equations (17) and (18) the x, y components $n_x$ and $n_y$ of a vector $\vec{n}$ normal to the interface 108 by the cell edges may be determined using a level set function. In step 720, the vector $\vec{n}$ is calculated at a point 802 centered among the four nodes consisting of the extended node and the three neighboring nodes that are used to calculate the extended node. The product CF(s) is also calculated at the point 802.

Once a concentration value has been calculated for the extended node 504b using the above equations than the second method goes on to the step 722 in which the second method is started over unless all of the nodes to be tested have been tested.

One should note that relative to tests being done to identify extended nodes the state of the cells in FIG. 8A is identical to the state of the cells in FIG. 6E. The concentration value at the identified extended node could be calculated using either the first method or the second method. In a preferred embodiment of the present invention, the concentration value at the extended node is calculated using the second method when both methods are applicable. In an embodiment of the present invention the first method 700 and second method 712 may be implemented in series.

Alternatively, the first method 700 and the second method 712 may be combined into a combination method. In the combination method, the steps 702 and 714 are combined into a single step. The steps 722 and 710 are also combined into a single step in the combination method. Such a combination may reduce execution time but increase complexity.

FIG. 8C-8F are additional examples of extended nodes 504b that are identified using the second method.

The applicant has found through experimentation that these two methods are better than prior art methods at conserving the mass of the solute when simulating the evaporation of a solvent in a droplet.

In an embodiment of the present invention, the product CF(s) is evaluated at cell centers as shown in equations (13-16) and cell edges as shown in equations (17-18). The concentration C values are defined at the cell centers and may also be easily extended to cell edges. While the flux F is defined along the interface 108.

The flux F may be evaluated so that it varies smoothly among cells containing the interface markers. Each interfacial segment has a flux F value associated with it. An interfacial segment may cross multiple cells or may be completely within a single cell. A cell centered flux value $F_{i,j}$ may be calculated by summing the flux F value of all the interfacial segment that are within a particular cell and a fraction of the flux value of segments that are partially within a cell. The fraction is equal to the length of the interfacial segment that is in cell over the total length of the interfacial segment. The cell centered flux value $F_{i,j}$ as used in a step 720 may also include the flux across an interface in the cell of the extended node 504a.

An embodiment of the present invention may calculate $[CF(s)]_{i,j}$ in a step 720 using any one of the three equations listed as equation (19). The product CF(s) may be calculated as either a sum of products $$\sum_{i,j} C_{i,j} F_{i,j}$$

or a product of sums $$\sum_{i,j} C_{i,j} \sum_{i,j} F_{i,j},$$

either of which will return reasonable results for CF(s). In which $C_{i,j}$ is the concentration at the test node (i,j) and $F_{i,j}$ is the flux across the interface between the test node and the extended node.

In the first and second alternatives of equation (19) the flux across the interface in the extended node is included explicitly and is represented as $F_{i,j+1}$. The first and second alternatives of equation (19) also include the concentration of the extended node $C_{i,j+1}$ in the calculation of $[CF(s)]_{i,j}$. If the first or second methods are used in the calculation of $[CF(s)]_{i,j}$ than the formula describing the calculation of the extended concentration node such as equation (13) will need to be reformulated to this into account. An individual skilled in the art would appreciate how to perform this simple algebraic reformulation of equation (13).

In the third alternative of equation (19) the flux $F_{i,j}$ includes the flux across the interface that is bounded by the cell of the test node and the flux across the interface that is bounded by the cell of the extended node. The flux $F_{i,j}$ in the third alternative of equation (19) may be a sum of the fluxes in the cell of the extended node and the test node or may be a sum of the extended node and test cell.

An individual skilled in the art will appreciate that this version of equation (19) applies to the calculation of $[CF(s)]_{i,j}$ in equation (13). An individual skilled in the art would also appreciate how equation (19) may be modified so that it may also be used in equations (14)-(16).

$$[CF(s)]_{i,j} = \frac{C_{i,j} F_{i,j} + C_{i,j+1} F_{i,j+1}}{2}, \quad (19)$$

$$[CF(s)]_{i,j} = \frac{(C_{i,j} + C_{i,j+1})}{2} \frac{(F_{i,j} + F_{i,j+1})}{2}, \text{ or}$$

$$[CF(s)]_{i,j} = C_{i,j} F_{i,j}$$

For the second method 712, the extended node is also the test node $C_{i,j}$. The concentration at the extended node is calculated in the step 720 using either equation (17) or equation (18). Three equations are listed as equation (20) each of these equations may be used to calculate the product CF(s) at the point 802 as shown in FIGS. 8A-8H. In the first alternative of equation (20) the product CF(s) at the point 802 is calculated by taking a spatial average of both the concentration and the flux around the point 802. In the first alternative of equation (20) the concentration value at the extended node is not used to calculate the product CF(s).

In a preferred embodiment of the present invention, the flux at the point 802 may be calculated by taking a spatial zero truncated mean of the flux passing through the interface of each of the cells surrounding point 802. In the context of the present application, a zero truncated mean is a mean of a set of elements, in which the zero elements of the set to be averaged are discarded and are not included in the count of the set to be averaged.

In a preferred embodiment of the present invention, the curvature of the interface relative to the size of unit cell is such that the interface only passes through three of the four cells surrounding the point 802. Thus, three of the four cells will have a nonzero flux, while the fourth cell has zero flux because the interface does not pass through the fourth cell. If the zero truncated average is used than the denominator in the mean calculation is three as opposed to four if an arithmetic mean is used. An example of this is shown in the first alternative of equation (20).

Equation (20) shows two additional alternative means of calculating the product CF(s). In the second alternative of equation (20) the product CF(s) is calculated as a sum of products of the concentration and the flux in the cells surrounding the point 802. An individual skilled in the art would appreciate how incorporating either of the two alternatives to equation (20) would require a simple algebraic reformulation of equation (17).

$$[CF(s)]_{i+\frac{1}{2},j-\frac{1}{2}} = \tag{20}$$

$$\frac{(C_{i+1,j} + C_{i,j-1} + C_{i+1,j-1})}{3} \frac{(F_{i,j} + F_{i+1,j} + F_{i,j-1} + F_{i+1,j-1})}{3}$$

$$[CF(s)]_{i+\frac{1}{2},j-\frac{1}{2}} = \frac{C_{i,j}F_{i,j} + C_{i+1,j}F_{i+1,j} + C_{i,j-1}F_{i,j-1} + C_{i+1,j-1}F_{i+1,j-1}}{4},$$

or $$[CF(s)]_{i+\frac{1}{2},j-\frac{1}{2}} =$$

$$\frac{C_{i,j} + C_{i+1,j} + C_{i,j-1} + C_{i+1,j-1}}{4} \frac{F_{i,j} + F_{i+1,j} + F_{i,j-1} + F_{i+1,j-1}}{4}$$

An individual skilled in the art would appreciate how each of the alternatives of equation (20) may be modified with the help of FIGS. 8A-B and used in equation (18). An individual skilled in the art would also appreciate how equation (20) could be modified so that it could be applied to higher dimensions or to an increase of the spatial area in which the averages are performed.

In an embodiment of the present invention, the mass of the solute is conserved. The extended concentration C values at the extended nodes 504 describes the concentration C in cells that are only partially in droplet 100 section of the simulation space. The total mass of solute $M_s$ may be calculated by integrating the concentration C over all the cells containing the droplet 100 as shown in equation (21). As used in equation (21) $A_{i,j}$ is the area of cell (i,j) that occupied by the droplet 100. The area, $A_{i,j}$ may be evaluated using the interface markers.

$$M_s = \int_V C\, dA = \sum_{(i,j)} C_{i,j} A_{i,j} \tag{21}$$

Numerical Results

Figure 9A:
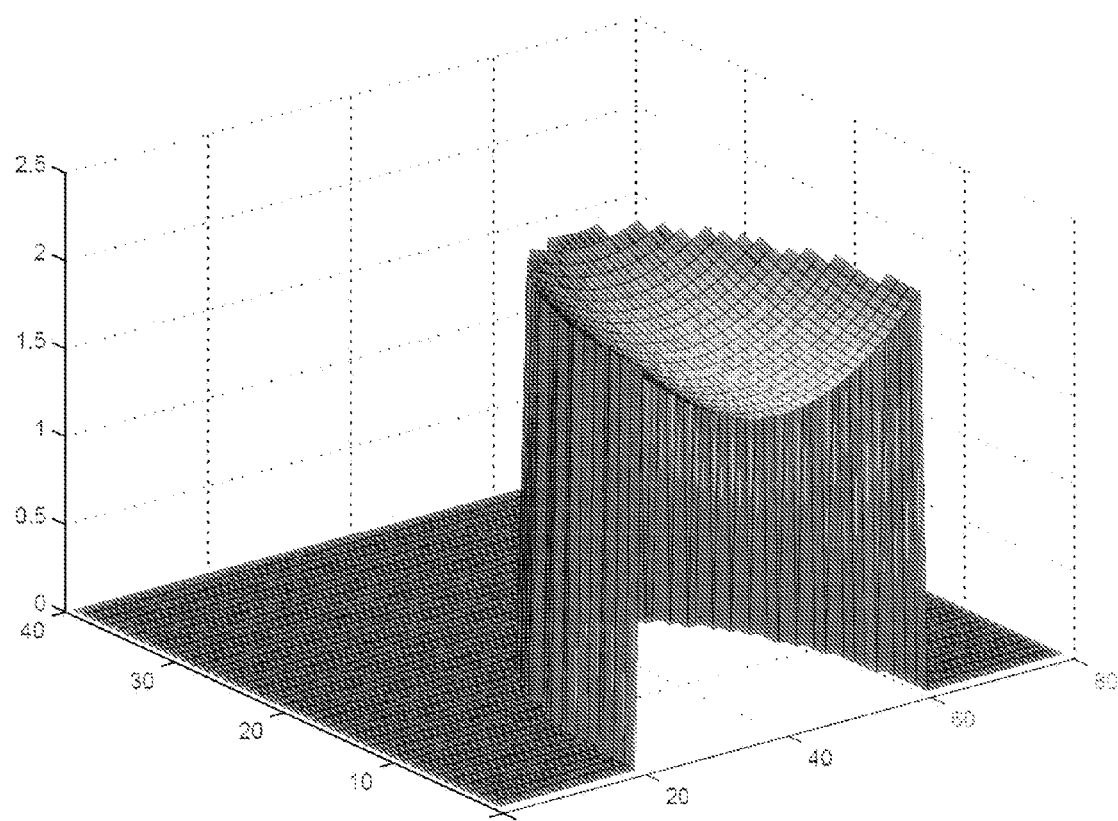
FIG. 9A is an illustration of the solute concentration results that may be obtained using an embodiment of the present invention.

FIG. 9A is an illustration of the results that may be obtained by the present invention. The three dimensional illustration in FIG. 9A is a plot of the concentration C of the solute as it varies over a two dimensional simulation space. The initial condition for the simulation shown in FIG. 9A are no flow $\vec{u}=0$, no evaporation, fixed FC=1, D=1 and mesh size h=0.05. The computational domain of interests is the droplet 100 encapsulated with an interface 108 that is fixed as a half unit circle with radius of one. Thus, there is a constant in-flux from the circular interface 108 of solute 104. Initially, C=0 throughout the droplet 100 but as time progresses C increases. FIG. 9A is an illustration of the numerical results given these particular boundary conditions.

The above boundary conditions allow for an analytical solution to be obtained by applying a Poisson integral as shown in equation (22).

$$C(r,\theta) = \frac{R^2 - r^2}{2\pi} \int_{-\Pi}^{\Pi} \frac{F(\phi)d\phi}{r^2 - R^2 - 2rR\cos(\theta - \phi)}. \tag{22}$$

Figure 9B:
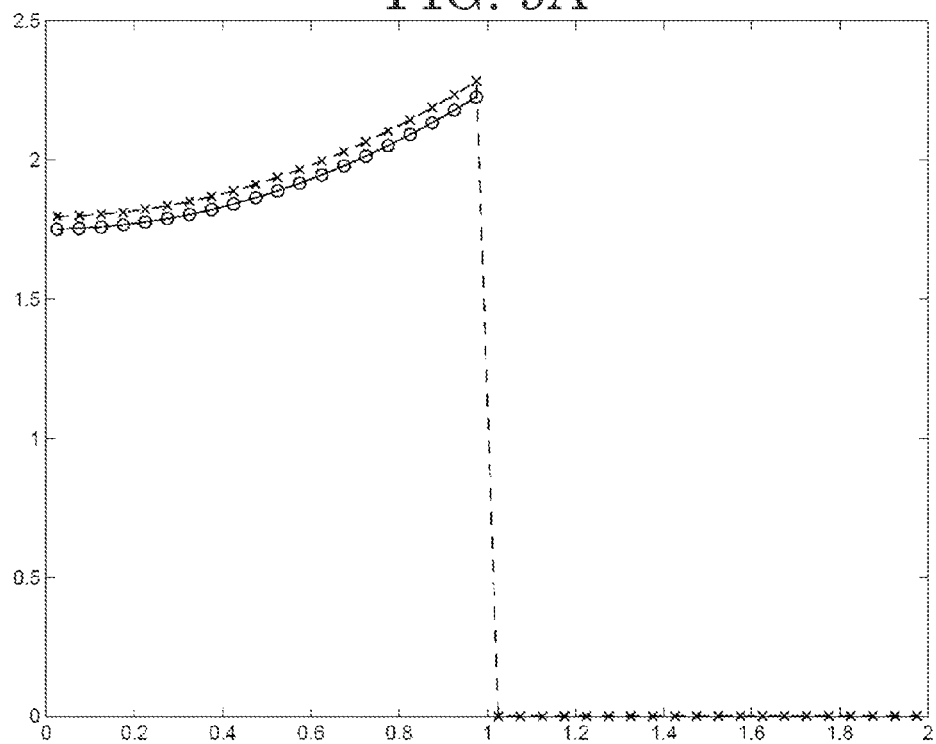
FIG. 9B is a comparison of the numerical and analytical results for a given simulation.

FIG. 9B is a comparison between a one dimensional analytical solution of the diffusion equation in which $$\left.\frac{\partial C}{\partial r}\right|_{r=1} = 1$$

and a radial slice of the results shown in FIG. 9A. As shown in FIG. 9B, the numerical results along the radius are very close to the analytical one dimensional solution. In FIG. 9B the analytical results are marked with a cross and the numerical results are marked with a circle. The horizontal axis is the radius r and the vertical axis is the concentration C.

Figure 10:
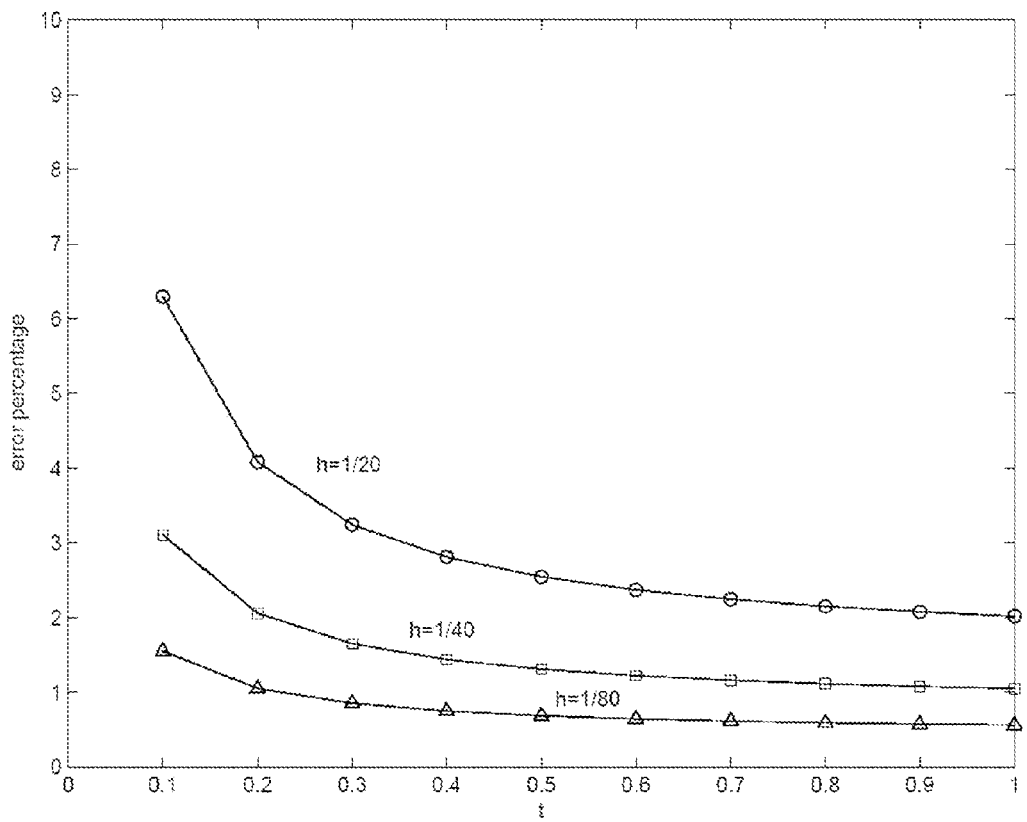
FIG. 10 is an illustration of the error rate of an embodiment of the present invention.

FIG. 10 is an illustration of a convergence test that shows that the total mass of solute is well conserved in the test case shown in FIG. 9A. FIG. 9B shows how the error percentage changes with time t for three different mesh sizes.

Figure 11:
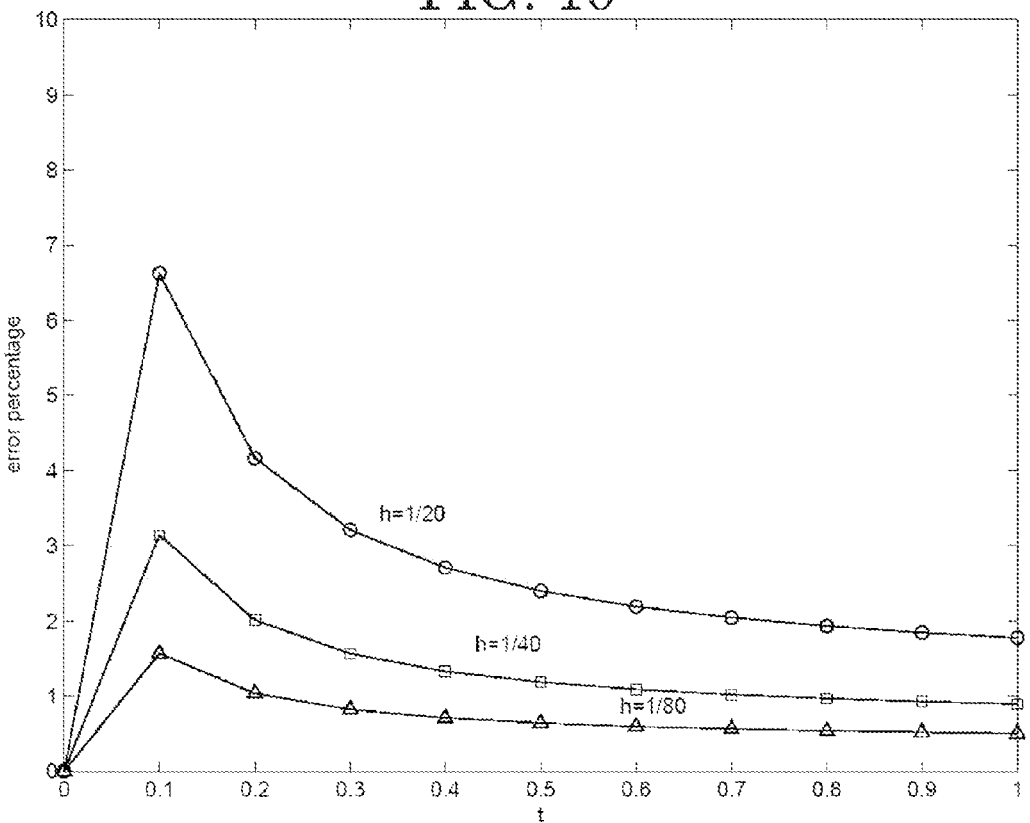
FIG. 11 is an additional illustration of the error rate of an embodiment of the present invention.

FIG. 11 is an additional illustration of the error rate as function of time with three different mesh sizes. In this example the flux rate F is function sin($\phi$) of the angle $\phi$ formed by substrate and radius connecting the center of the droplet 100 and point on the interface 108. FIG. 11, like FIG. 10 shows that the mass of the solute is well conserved.

The following is an example in which an embodiment of the invention in practiced. In this example there is still no flow, $\vec{u}=0$, but the evaporation rate is F=0.02 sin($\phi$) along the interface 108. The computational domain of interests is the droplet 100 encapsulated with the interface 108 and is initially a half unit circle with radius of one. The diffusion constant D is equal to one, D=1. The concentration of solute C is initially 1, C=1 inside the droplet.

As shown in FIG. 11 the mass of the solute is well conserved. As shown in FIG. 11 the error is decreasing over time and is less than 0.2 percent for mesh sixe of h=1/80.

Figure 12:
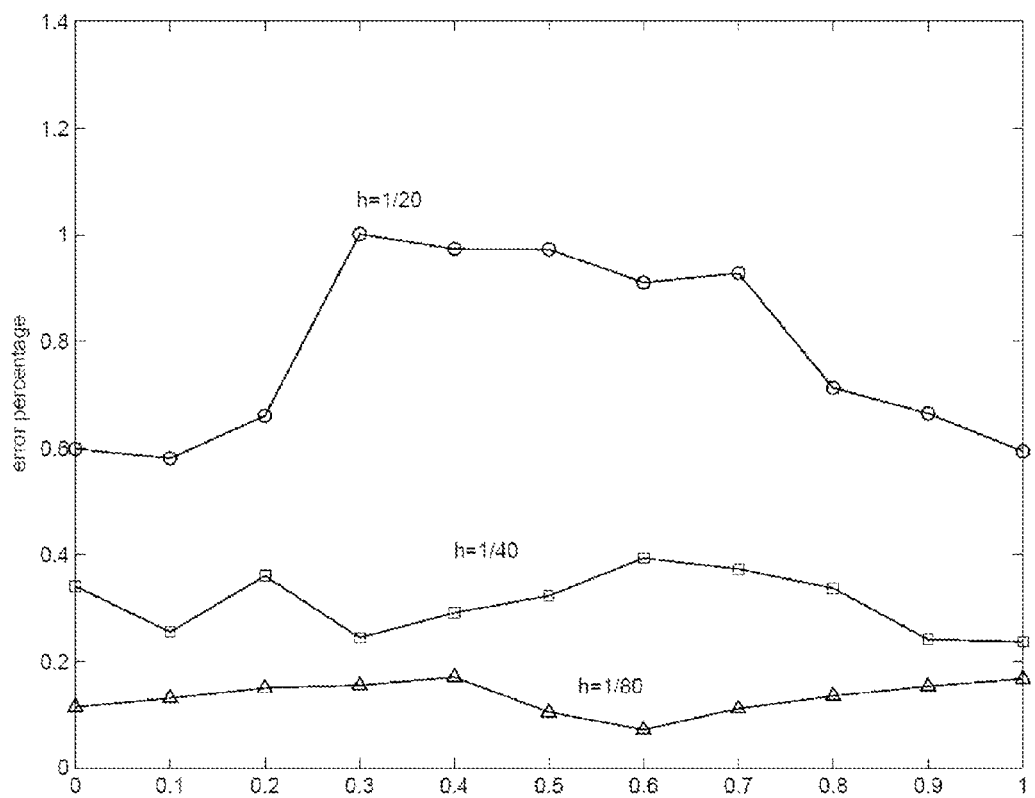
FIG. 12 is an additional illustration of the error rate of an embodiment of the present invention.

FIG. 12 is an illustration of error rates over time with three mesh sizes in which an embodiment of the present invention is used to simulate a system with varying evaporating rates and a shrinking droplet 100. The interface 108 of the droplet 100 initially has the shape of a half circle. The surface tension along the interface 108 is σ=10. The two contact points between the interface 108 and the substrate 102 are fixed. The diffusion coefficient is set to D=0.01. The evaporation rate is set to F=0.02|cos($\phi$)|. We assume that the evaporating rate is 0.02|cos($\phi$)|. The concentration of solute C is initially 1, C=1 inside the droplet.

Figure 13:
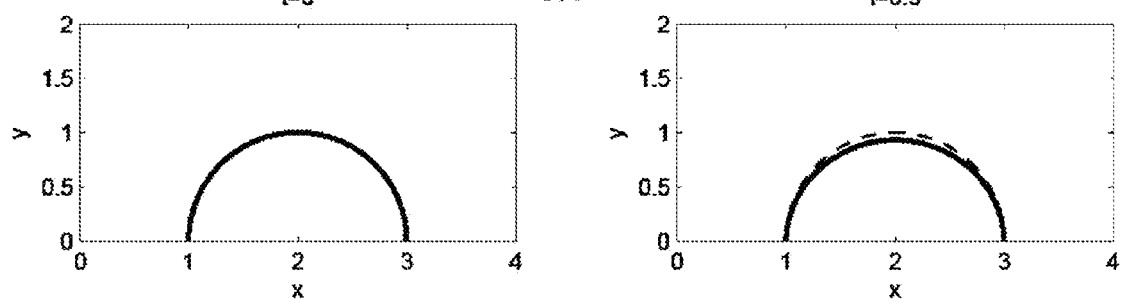
FIG. 13 is an illustration of the interface of the droplet at four different times.

FIG. 13 is an illustration of the interface 108 at four different times, t=0, t=0.3, t=0.6 and t=1.0. The dashed line shows the initial position of the interface 108. As time develop the droplet shrinks.

Figure 14:
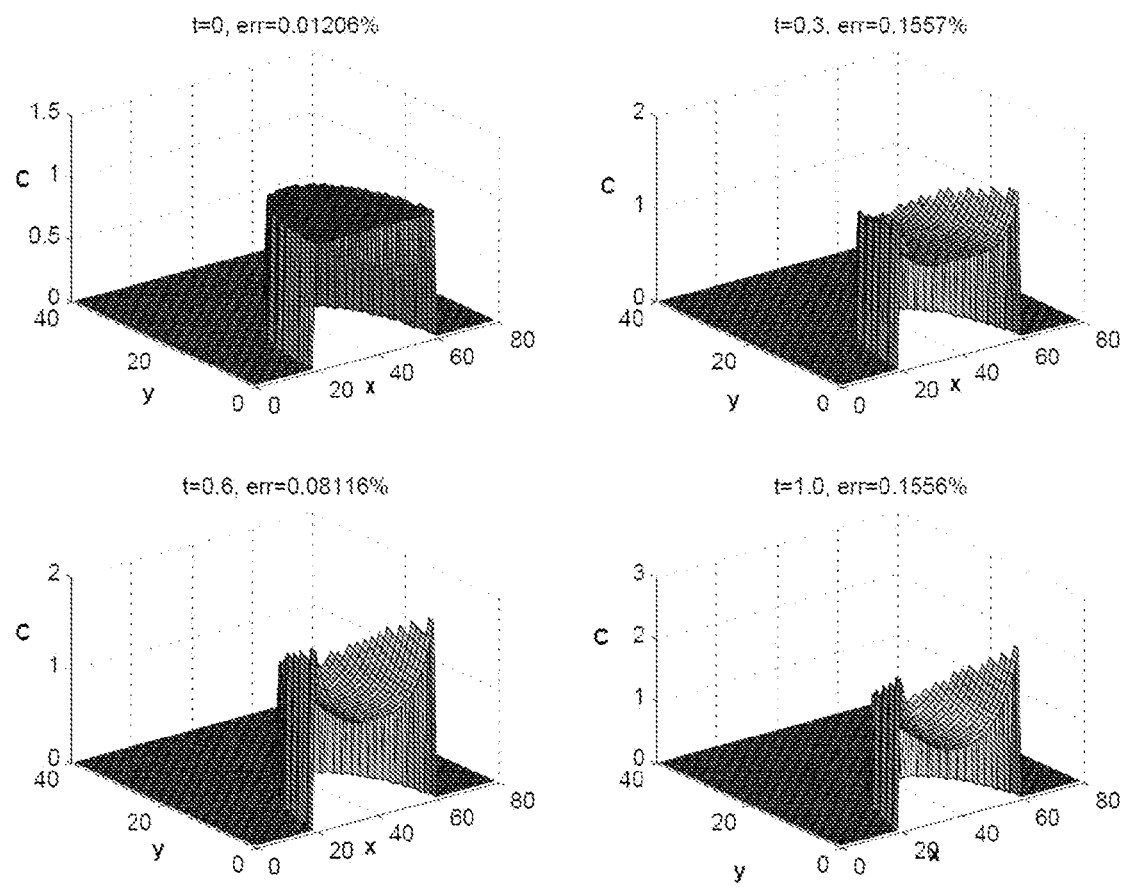
FIG. 14 is an illustration of the solute concentration inside of the droplet at four different times.

FIG. 14 is an illustration of the variation of the concentration C of solute over the area of the droplet 100 at four different times. As shown in FIG. 14 as the droplet evaporates the solute concentration is accumulating increases in the neighborhood of the contact line. This can be verified by the experimental results.

System

Figure 15:
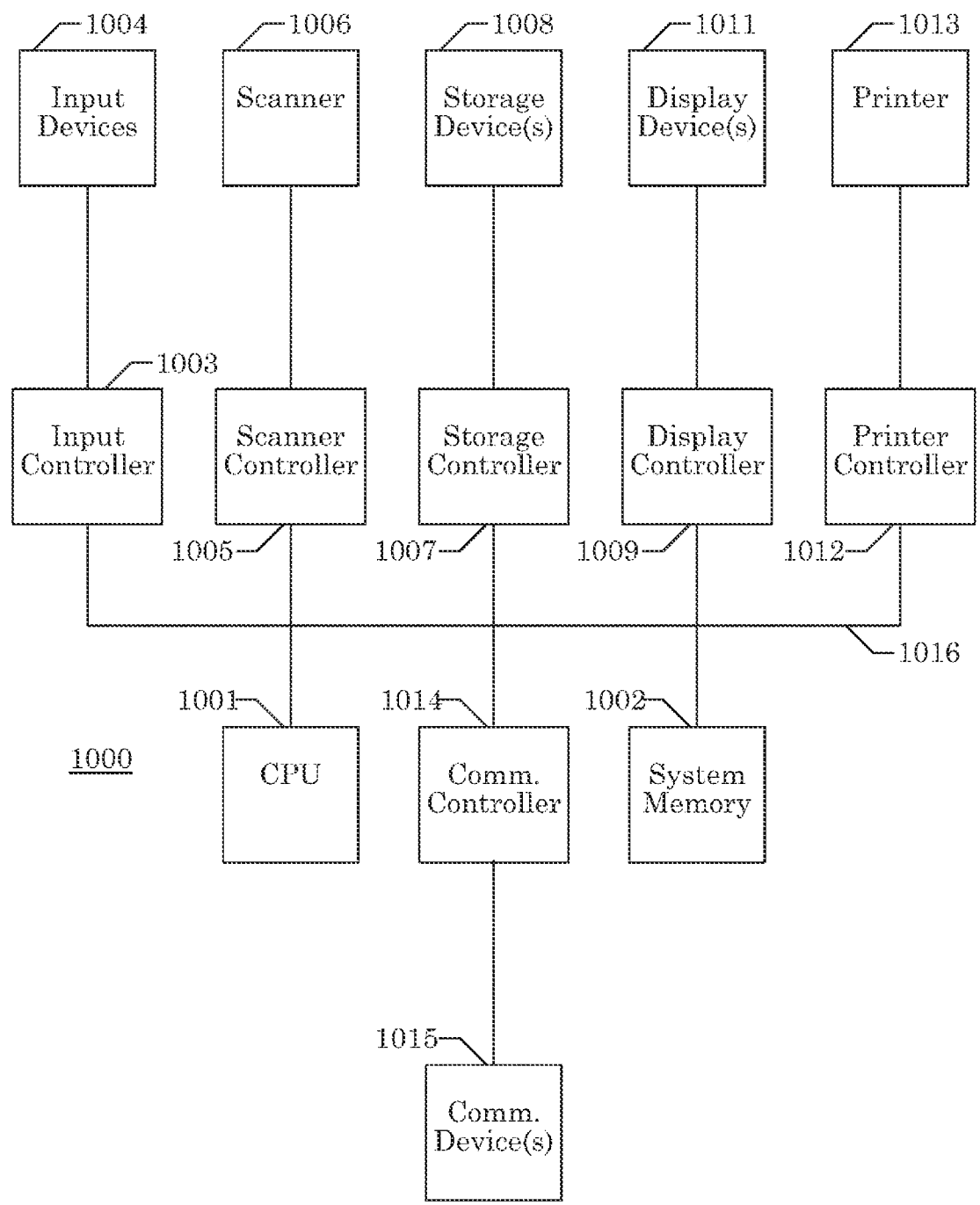
FIG. 15 is an illustration of a system in which an embodiment of the system may be practiced.

Having described the details of the invention, an exemplary system 1000, which may be used to implement one or more aspects of the present invention will now be described with reference to FIG. 15. As illustrated in FIG. 15, the system includes a central processing unit (CPU) 1001 that provides computing resources and controls the computer. The CPU 1001 may be implemented with a microprocessor or the like, and may also include a graphics processor and/or a floating point coprocessor for mathematical computations. The system 1000 may also include system memory 1002, which may be in the form of random-access memory (RAM) and read-only memory (ROM).

A number of controllers and peripheral devices may also be provided, as shown in FIG. 15. An input controller 1003 represents an interface to various input device(s) 1004, such as a keyboard, mouse, or stylus. There may also be a scanner controller 1005, which communicates with a scanner 1006. The system 1000 may also include a storage controller 1007 for interfacing with one or more storage devices 1008 each of which includes a storage medium such as magnetic tape or disk, or an optical medium that might be used to record programs of instructions for operating systems, utilities and applications which may include embodiments of programs that implement various aspects of the present invention. Storage device(s) 1008 may also be used to store processed data or data to be processed in accordance with the invention. The system 1000 may also include a display controller 1009 for providing an interface to a display device 1011, which may be a cathode ray tube (CRT), or a thin film transistor (TFT) display. The system 1000 may also include a printer controller 1012 for communicating with a printer 1013. A communications controller 1014 may interface with one or more communication devices 1015 which enables the system 1000 to connect to remote devices through any of a variety of networks including the Internet, a local area network (LAN), a wide area network (WAN), or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be recorded on a computer-readable medium including magnetic tape or disk or optical disc, or a transmitter, receiver pair. One or more programs that allow a computer to implement the present invention may be embodied, encoded, or recorded on a computer-readable medium.

The present invention may be conveniently implemented with software. However, alternative implementations are certainly possible, including a hardware implementation or a software/hardware implementation. Any hardware-implemented functions may be realized using ASIC(s), digital signal processing circuitry, or the like. Accordingly, the "means" terms in the claims are intended to cover both software and hardware implementations. Similarly, the term "machine-readable medium" as used herein includes software, hardware having a program of instructions hardwired thereon, or a combination thereof. With these implementation alternatives in mind, it is to be understood that the figures and accompanying description provide the functional information one skilled in the art would require to write program code (i.e., software) or to fabricate circuits (i.e., hardware) to perform the processing required.

In accordance with further aspects of the invention, any of the above-described methods or steps thereof may be embodied in a program of instructions (e.g., software), which may be stored on, or conveyed to, a computer or other processor-controlled device for execution. Alternatively, any of the methods or steps thereof may be implemented using functionally equivalent hardware (e.g., application specific integrated circuit (ASIC), digital signal processing circuitry, etc.) or a combination of software and hardware.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A computer-readable medium encoded with instructions for execution to perform a method for simulating and analyzing a change in a concentration of a solute in a solution, wherein the solution is encompassed by an interface, the instructions comprising instructions for:
    (a) determining the concentration at a set of nodes encompassed by the interface, at a first point in time, wherein a spatial cell is associated with each node;
    (b) identifying a first type of extended node, identifying a second type of extended node, calculating an extended concentration at the first type of extended node using a first method, and calculating an extended concentration at the second type of extended node using a second method distinct from the first method, wherein neither the first nor the second type of extended node is encompassed by the interface; and
    (c) calculating the concentration at a set of nodes encompassed by the interface, at a second point in time, based upon the concentration at the set of nodes encompassed by the interface at the first point in time and the extended concentration.

2. The computer-readable medium of claim 1, wherein:
    the first type of extended node is a neighbor of a first type of test node, the first type of test node is encompassed by the interface, only one of the neighbors of the first type of test node is not encompassed by the interface, and all other neighbors of the first type of test node are encompassed by the interface; and
    half of the second type of extended node's neighboring nodes are encompassed by the interface, the nodes encompassed by the interface neighboring the second type of extended node are identified as belonging to a set of a second type of test nodes associated with the second type of extended node, and a node neighboring at least two nodes in the set of the second type of test nodes associated with the second type of extended node and is also encompassed by the interface is identified as belonging to the set of the second type of test nodes associated with the second type of extended node.

3. The computer-readable medium of claim 2, wherein:
    the first method comprises calculating the extended concentration based upon the concentration at the first type of test node, the concentration at nodes neighboring the first type of test node and encompassed by the interface, and flux across a portion of the interface in a region of simulation space bounded by a cell associated with the first type of test node and the cell associated with the first type of extended node; and
    the second method comprises calculating the extended concentration based upon the concentration at the set of second type of test nodes associated with the second type of extended node, and the flux across a portion of the interface in a region of simulation space bounded by cells associated with the set of second type of test nodes associated with the second type of extended node and the cell associated with the second type of extended node.

4. The computer-readable medium of claim 1, wherein instructions (c) for calculating the concentration at the second point in time comprises instructions for calculating diffusion of the solute in the solution from the first point to the second point in time.

5. The computer-readable medium of claim 1, wherein instructions (c) for calculating the concentration at the second point in time comprises instructions for calculating advection of the solution from the first point in time to the second point in time.

6. The computer-readable medium of claim 1, wherein a spatial location of a portion of the interface varies with time.

7. The computer-readable medium of claim 1, wherein instructions (c) comprises instructions for:
(c.1) calculating advection of the solution from the first point in time to the second point in time;
(c.2) calculating motion of the interface from the first point in time to the second point in time based in part on the results of step (c.1); and
(c.3) calculating diffusion of the solute based in part on results of steps (c.1-2).

8. The computer-readable medium of claim 1, wherein each spatial cell is representative of one geometric quantity from the group consisting of:
a specific area; and
a specific volume.

9. A computer-readable medium encoded with instructions for execution to perform a method for simulating and analyzing the evaporation of a solution, the instructions comprising instructions for:
(a) discretizing a simulation space as a set of nodes, each particular node associated with a particular cell in the simulation space, wherein each particular node is representative of a particular point in the simulation space;
(b) identifying a plurality of nodes in the simulation space at a first point in time as environment nodes, wherein the environment nodes are representative of points in the simulation space in which the solution is absent, and the plurality of environment nodes as a group are representative of the environment in which solution is being simulated in;
(c) identifying a plurality of nodes in the simulation space at the first point in time as droplet nodes, wherein the droplet nodes are representative of points in the simulation space in which the solution is present, and the plurality of droplet nodes as a group are representative of the solution;
(d) identifying an interface at the first point in time between the droplet nodes and the environment nodes, wherein the interface represents a surface separating the solution from the environment;
(e) determining a concentration of solute in the solution at the plurality of droplet nodes at the first point in time; and
(f) determining the concentration of the solute at a plurality of nodes at a second point in time based upon advection and diffusion of the solution comprises;
(f.1) identifying a first type of extended node, wherein the first type of extended node is an environment node and is a neighbor of a first type of test node, wherein the first type of test node is a droplet node, only one of the neighbors of the first type of test node is an environment node, and all other neighbors of the first type of test node are droplet nodes;
(f.2) calculating an extended concentration of solute in the solution at the first type of extended node based upon the concentration of solute at the first type of test node, the concentration of the solute at the droplet nodes neighboring the first type of test node, and the flux across a portion of the interface in a region of simulation space bounded by a cell associated with the first type of test node and a cell associated with the first type of extended node;
(f.3) identifying a second type of extended node, wherein the second type of extended node is an environment node and half of the second type of extended node's neighboring nodes are droplet nodes, droplet nodes neighboring the second type of extended node are identified as a set of a second type of test nodes associated with the second type of extended node, and a droplet node neighboring at least two nodes in the set the second type of test nodes associated with the second type of extended node is identified as belonging to the set of the second type of test nodes associated with the second type of extended nodes;
(f.4) calculating an extended concentration of solute in the solution at the second type of extended node based upon the concentration of solute at the set of second type of test nodes associated with the second type of extended node, and the flux across the interface in a region of simulation space bounded by cells associated with the set of second type of test nodes associated with the second type of extended node and a cell associated with the second type of extended node; and
(f.5) calculating diffusion of the concentration at the droplet nodes at a second point in time based upon the concentration of solute at the droplet nodes and the extended concentration of solute at the first and second type of extended nodes.

10. The computer-readable medium of claim 9, wherein each particular cell is representative of one geometric quantity from the group consisting of:
a specific area of the simulation space; and
a specific volume of the simulation space.

11. The computer-readable medium of claim 9, wherein instructions (f) includes instructions for calculating the advection of the solution based upon the concentration of the solute at the first point in time and an estimation of a local velocity of the solution at the first point in time.

12. The computer-readable medium of claim 11, wherein instructions for calculating the advection of the solution includes instructions for calculating the concentration of the solute at a particular node at a second point in time based on the concentration of the solute at the particular node at the first point in time, the concentration of the solute at the particular node's neighbors at the first point in time, and the identity of each of the node's neighbors as either a droplet node or an environment node.

13. The computer-readable medium of claim 9, wherein a spatial location of a portion of the interface varies with time.

14. The computer-readable medium of claim 9, wherein instructions (f) includes instructions for:
(f.6) calculating the advection of the solution from the first point in time to the second point in time;
(f.7) calculating the motion of the interface from the first point in time to the second point in time based in part on the results of step (f.6); and
(f.8) calculating the diffusion of the solute based in part on the results of steps (f.6-8).

* * * * *